(12) United States Patent
Uhkoetter et al.

(10) Patent No.: US 11,073,041 B2
(45) Date of Patent: Jul. 27, 2021

(54) JET ENGINE

(71) Applicant: Rolls-Royce Deutschland Ltd & Co KG, Blankenfelde-Mahlow (DE)

(72) Inventors: Stephan Uhkoetter, Berlin (DE); Uwe Kracht, Berlin (DE); Thomas Philip Astley, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 130 days.

(21) Appl. No.: 16/199,799

(22) Filed: Nov. 26, 2018

(65) Prior Publication Data
US 2019/0195091 A1    Jun. 27, 2019

(30) Foreign Application Priority Data

Nov. 30, 2017    (DE) ..................... 10 2017 128 483.4

(51) Int. Cl.
*F01D 25/20* (2006.01)
*F01M 11/06* (2006.01)
(Continued)

(52) U.S. Cl.
CPC ............. *F01D 25/20* (2013.01); *B64D 37/22* (2013.01); *F01M 1/02* (2013.01); *F01M 1/16* (2013.01); *F01M 11/067* (2013.01); *F01M 11/08* (2013.01); *F02C 7/06* (2013.01); *F02C 7/32* (2013.01); *F16N 39/002* (2013.01); *F01M 2001/0253* (2013.01); *F05D 2220/32* (2013.01);
(Continued)

(58) Field of Classification Search
CPC . F02C 7/06; F01D 25/18; F01D 25/20; B64D 37/22; F01M 11/067; F01M 11/08; F01M 1/02; F01M 1/16
See application file for complete search history.

(56) References Cited

U.S. PATENT DOCUMENTS 3,722,624 A    3/1973  Buckland
3,889,705 A *  6/1975  Coderre ................. F16L 55/04
                                                           137/171
(Continued)

FOREIGN PATENT DOCUMENTS

DE           3137947 A1    4/1982
DE         69102468 T2    12/1994
(Continued)

OTHER PUBLICATIONS

German Search Report dated Oct. 24, 2018 for counterpart German Patent Application No. 10 2017 128 483.4.
(Continued)

*Primary Examiner* — Craig Kim
(74) *Attorney, Agent, or Firm* — Shuttleworth & Ingersoll, PLC; Timothy Klima

(57) ABSTRACT

An aircraft engine having an oil circuit and a transmission that can be supplied with oil via the oil circuit. Oil fed to the transmission can be directed out of the transmission into an oil reservoir, from which oil can be introduced directly back into the transmission via a hydraulic line path. According to the invention, the oil fed to the oil reservoir can only be fed to the hydraulic line path below a defined filling level of the oil reservoir. When the defined filling level of the oil reservoir is reached, oil can also be introduced into a further hydraulic line path.

19 Claims, 22 Drawing Sheets

(51) Int. Cl.
  *F02C 7/06* (2006.01)
  *F01M 11/08* (2006.01)
  *F02C 7/32* (2006.01)
  *B64D 37/22* (2006.01)
  *F16N 39/00* (2006.01)
  *F01M 1/02* (2006.01)
  *F01M 1/16* (2006.01)

(52) U.S. Cl.
  CPC .... *F05D 2260/609* (2013.01); *F05D 2260/98* (2013.01)

(56) References Cited

U.S. PATENT DOCUMENTS

| | | | | |
|---|---|---|---|---|
| 4,531,358 | A * | 7/1985 | Smith | F16N 29/02 60/39.08 |
| 5,141,179 | A | 8/1992 | Gautier | |
| 5,681,372 | A * | 10/1997 | Magits | F01M 13/021 95/273 |
| 6,463,819 | B1 * | 10/2002 | Rago | F01M 11/067 184/6.2 |
| 6,793,042 | B2 * | 9/2004 | Brouillet | F01D 25/18 184/103.1 |
| 6,913,040 | B2 * | 7/2005 | Crossman | B01D 29/117 137/587 |
| 8,181,746 | B2 * | 5/2012 | Szolomayer | F01D 25/18 184/6.11 |
| 8,459,413 | B2 * | 6/2013 | Gmirya | F01M 11/10 184/6.4 |
| 10,513,949 | B2 * | 12/2019 | Parnin | F02K 3/06 |
| 2010/0212281 | A1 * | 8/2010 | Sheridan | F02C 7/36 60/39.08 |
| 2014/0290761 | A1 * | 10/2014 | Apostolides | F16K 17/0473 137/511 |
| 2016/0032773 | A1 | 2/2016 | James et al. | |
| 2016/0076399 | A1 * | 3/2016 | Beier | F01D 25/18 184/6.11 |
| 2016/0245117 | A1 | 8/2016 | Parnin et al. | |
| 2017/0370255 | A1 | 12/2017 | Beier | |

FOREIGN PATENT DOCUMENTS

| | | | |
|---|---|---|---|
| DE | 102016111838 A1 | 12/2017 | |
| GB | 1136852 A * | 12/1968 | ............. F02C 7/105 |
| GB | 1508212 A | 4/1978 | |

OTHER PUBLICATIONS

Eurpean Search Report dated Apr. 5, 2019 for counterpart European Patent Application No. 18209407.8.

* cited by examiner

JET ENGINE

CROSS-REFERENCE TO A RELATED APPLICATION

This application claims priority to German Application No. 10 2017 128 483.4 filed Nov. 30, 2017, which application is incorporated by reference herein.

The invention relates to an aircraft engine having an oil circuit and having a transmission that can be supplied with oil via the oil circuit, as disclosed herein.

US 2016/0245117 A1 discloses a lubricating system for a transmission, associated with a fan, of a turbofan engine. The lubricating system comprises an auxiliary pump, by means of which oil or lubricant is pumped to bearings of the transmission. Oil fed to the transmission can be directed out of the transmission into an oil reservoir, from which oil can be introduced directly back into the transmission via a hydraulic line path.

US 2016/0032773 A1 furthermore shows a system of a turbine engine having a turbine engine component, a lubricant collection unit and a plurality of lubricant circuits. The lubricant collection unit is connected to the turbine engine component, wherein lubricant can be passed from the lubricant collection unit to the turbine engine component via the connection. The lubricant circuits are coupled between the lubricant collection unit and the turbine engine component. Furthermore, the lubricant circuits include a first circuit and a second circuit configured in parallel with the first circuit. Each of the lubricant circuits has a lubricant pump. The first and the second circuit receive lubricant from the lubricant collection unit, and carry the supplied lubricant to the turbine engine component, which is designed as a transmission.

By means of the solutions known from the prior art, it is not possible to supply a transmission of an aircraft engine with oil or lubricant to the desired extent over the entire operating state range of an aircraft engine. As a result, there is the possibility that, during prolonged operating states involving undersupply, the transmission will be subject to thermal and mechanical stresses to an extent which will permanently compromise operation.

It is the underlying object of the invention to make available an aircraft engine in which a transmission can be supplied with oil to a sufficient extent over the entire operating range of the aircraft engine.

According to the invention, this object is achieved by means of an aircraft engine as disclosed herein.

The aircraft engine according to the invention comprises an oil circuit and a transmission that can be supplied with oil via the oil circuit. Oil fed to the transmission can be directed out of the transmission into an oil reservoir, from which oil can be introduced directly back into the transmission via a hydraulic line path.

According to the invention, the oil fed to the oil reservoir can only be fed to the hydraulic line path below a defined filling level of the oil reservoir. When the defined filling level of the oil reservoir is reached, oil can also be introduced into a further hydraulic line path.

By virtue of the prioritized supply according to the invention of the hydraulic line path with oil, starting from the oil reservoir, over the further hydraulic line path, an adequate supply of oil to the transmission over the entire operating range of an aircraft engine is ensured in a manner which is simpler in terms of design with, at the same time, a low complexity in terms of open-loop and closed-loop control. This is the case even when the transmission is supplied with an oil volume flow which prevents a rise in the oil volume temporarily stored in the oil reservoir above the defined filling level of the oil reservoir.

In an embodiment of the aircraft engine according to the invention which is of simple design and inexpensive, an opening of the hydraulic line path for the removal of oil from the oil reservoir is arranged below the defined filling level of the oil reservoir. This is a simple way of implementing the prioritized supply of the hydraulic line path over the further hydraulic line path.

If an opening of the further hydraulic line path for the removal of oil from the oil reservoir is arranged at the level of the defined filling level of the oil reservoir, the prioritized supply of the hydraulic line path over the further hydraulic line path is once again ensured in a manner which is simple in terms of design with, at the same time, a low complexity in terms of open-loop and closed-loop control.

If a transfer region is provided, via which oil can be introduced from the oil reservoir into the further hydraulic line path once the defined filling level of the oil reservoir has been reached, the further hydraulic line path is once again supplied with oil, starting from the return of the transmission, only when the defined filling level in the oil reservoir is reached. This once again ensures that oil is supplied only to the hydraulic line path, starting from the return of the transmission, as long as the defined filling level of the oil reservoir has not been reached. It is only when the defined filling level of the oil reservoir has been reached that oil fed into the oil reservoir is directed in the direction of the transfer region and hence of the further hydraulic line path. The prioritized supply of the hydraulic line path, starting from the return of the transmission, is thus ensured in a manner which is simple in terms of design with, at the same time, a low complexity in terms of open-loop and closed-loop control.

At the same time, there is the possibility of embodying the transfer region as a further hydraulic reservoir, as a collecting channel or the like.

In another advantageous embodiment of the aircraft engine according to the invention, supply of the transmission with oil via the hydraulic line path is implemented by the hydraulic line path having a pump, by means of which oil can be pumped out of the oil reservoir into the transmission.

In a development of the aircraft engine according to the invention which is simple in terms of design and advantageous in terms of installation space, the pump can be driven by the transmission.

If the operative connection between the transmission and the pump can be activated or deactivated, the aircraft engine according to the invention can be operated with low power losses during operating state processes during which the transmission can be supplied with sufficient oil and there is no need to supply the transmission via the hydraulic line path. This results from the fact that, during such operating state processes, the operation of the pump can be switched off in a simple manner by deactivating the operative connection between the transmission and the pump. Power losses due to continuous pump operation can furthermore be avoided in a simple manner while the transmission is being adequately supplied with oil without additionally admitting oil to the transmission from the hydraulic line path if the operative connection between the transmission and the pump is activated only when undersupplied operating states of the transmission are detected. It is furthermore advantageous here that wear in the region of the pump operated only when required is minimized, thereby increasing in a simple manner a service life of the pump in comparison with a continuously driven pump.

In this case, there is the possibility, for example, that the operative connection between the pump and the transmission comprises a clutch, which is closed to activate the operative connection or opened to deactivate the operative connection.

In another advantageous embodiment of the aircraft engine according to the invention, the hydraulic line path in the region between the pump and the transmission comprises a valve unit, by means of which oil pumped out of the oil reservoir by the pump can either be directed in the direction of the transmission or back into the oil reservoir or can be introduced into the further hydraulic line path. In this embodiment of the aircraft engine according to the invention, the operative connection between the transmission and the pump can be implemented without corresponding means for activating or deactivating the operative connection, wherein the pump is then driven continuously by the transmission during the operation of the aircraft engine. The valve unit provides a simple way of introducing the oil volume flow that emerges in the region of the return of the transmission directly back into the transmission via the hydraulic line path during undersupplied operating states of the transmission. During adequate supply of the transmission with oil, there is additionally the possibility, without additionally supplying the transmission via the hydraulic line path, of discharging the oil volume introduced into the hydraulic line path into the further hydraulic line path in the region of the valve unit and thus of avoiding oversupply of the transmission or of introducing said oil directly back into the oil reservoir and of being able to ensure the desired prioritized supply of the hydraulic line path with hydraulic fluid.

In an embodiment of the aircraft engine according to the invention which is advantageous in terms of installation space both in the radial direction and in the axial direction, the transmission is arranged radially within a core engine flow region of the aircraft engine.

In another advantageous embodiment, an oil separator is provided in the oil reservoir between an inlet for the oil discharged from the transmission and the opening of the further hydraulic line path. By means of the oil separator, oil can be separated from an air-oil mixture emerging from the transmission and flowing into the oil reservoir via the inlet. The oil separated out in the region of the oil separator is stored in the oil reservoir, while the oil volume flow cleaned in the region of the oil separator and emerging with a low oil content from the oil separator is carried in the direction of the further hydraulic line path as long as the oil level in the oil reservoir is below the defined filling level. Once again, this ensures prioritized supply of the hydraulic line path over the further hydraulic line path in a manner which is simple in terms of design with, at the same time, a low complexity in terms of open-loop and closed-loop control.

In an embodiment of the aircraft engine according to the invention which is simple in terms of design, the oil separator comprises an inertial separator.

In the present case, the term "inertial separator" subsumes devices by means of which oil, preferably in the form of droplets, can be separated out from an air-oil volume flow by virtue of the fact that the oil, which has higher inertia, as it flows against, around and/or through such devices, e.g. baffles, deflection devices, porous materials or the like, impinges upon regions of the devices and is deposited there, and the oil flows off the devices in the direction of the hydraulic line path.

There is the possibility here that the baffles are of continuous design or designed with passages for the air-oil volume flow passed through the hydraulic fluid reservoir and are arranged with a suitable orientation in the flow path of an air-oil volume flow through the hydraulic fluid reservoir. Here, the passages in the baffles can be holes, slot-type apertures, angular apertures or the like, through which the air-oil volume flow can directly flow or which are at least in part preceded by a cover, as in a cheese grater for example, around which the air-oil volume flow has to flow before flowing through the passage. In addition, there is also the possibility that the baffles are of flat and/or curved design and extend into the interior of the oil reservoir, at least in some region or regions. Here, the curvature of the baffles can be made convex or concave in relation to the flow direction of the air-oil volume flow between the inlet and the opening of the further hydraulic line path. Provision can be made here for the baffles to project into the interior of the oil reservoir from an upper boundary wall of the oil reservoir or to be positioned at a defined distance from the upper boundary wall. Furthermore, provision can also be made for the air-oil volume flow discharged from the transmission to be passed through at least one pipe elbow and for the oil separated out within the pipe elbow by the deflection of the air-oil volume flow to flow off in the direction of the hydraulic line path.

In an embodiment of the aircraft engine according to the invention which is simple in terms of design, the oil separator is formed with a porous medium, through which an air-oil volume flow emerging from the transmission, from the inlet in the direction of the opening of the further hydraulic line path, can be passed, wherein oil separated from the air-oil volume flow in the region of the porous medium flows off in the direction of the oil reservoir.

In another embodiment of the aircraft engine according to the invention which is simple in terms of design, a retention device is provided between the opening of the hydraulic line path and the opening of the further hydraulic line path. The retention device at least limits a flow of oil in the oil reservoir from a region of the oil reservoir associated with the opening of the hydraulic line path in the direction of the opening of the further hydraulic line path. By means of the retention device, it is ensured in a simple manner that oil volume present in the oil reservoir flows out of the oil reservoir only to a small extent in the direction of the further hydraulic line path when the oil level in the oil reservoir is below the defined filling level during unfavorable operating state processes of the aircraft engine according to the invention, e.g. during large deviations from horizontal flight of an aircraft embodied with the aircraft engine according to the invention.

Furthermore, the retention device separates that region of the interior of the oil reservoir which is associated with the opening of the hydraulic line path from the region of the interior of the oil reservoir which is associated with the opening of the further hydraulic line path and thus prevents entrainment and swirling of oil present in that region of the interior of the oil reservoir which is associated with the opening of the hydraulic line path by the air-oil volume flow flowing into the oil reservoir via the inlet.

Furthermore, that region of the interior of the oil reservoir which is associated with the opening of the hydraulic line path forms such a calm space below the retention device that good phase separation is possible in the region of the oil stored there, and rising of air bubbles in the stored oil volume is not impaired by the air-oil volume flow passed through the oil reservoir.

If a housing region of the oil reservoir which delimits that region of the interior of the oil reservoir which is associated with the opening of the hydraulic line path is of funnel-shaped design, at least in some region or regions, it is ensured in a manner which is simple in terms of design that the oil volume stored in the oil reservoir is discharged from the oil reservoir into the hydraulic line path, irrespective of a current attitude of an aircraft constructed with the aircraft engine according to the invention.

In a development of the aircraft engine according to the invention which is simple in terms of design, the retention device has at least one retaining wall, which extends between the opening of the hydraulic line path and the opening of the further hydraulic line path and is formed with at least one passage. The passage forms a connection between an inner region of the oil reservoir, which is delimited by the retaining wall and into which the line path opens, and a further inner region of the oil reservoir, which is delimited by the retaining wall and into which the further line path opens.

If the retaining wall is of funnel-shaped design, at least in some region or regions, it is once again ensured with little design complexity that the oil introduced into the oil reservoir from the return of the transmission is passed through the retention device into the region of the interior which is associated with the hydraulic line path substantially independently of the current attitude of the aircraft.

In an advantageous development of the aircraft engine according to the invention, the funnel-shaped region of the housing region of the oil reservoir and the funnel-shaped region of the retaining wall are matched to one another in such a way that a defined oil volume can be retained by the retention device in that region of the interior of the oil reservoir which is associated with the opening of the hydraulic line path in various attitudes of an aircraft that deviate from horizontal flight of the aircraft embodied with the aircraft engine. It is thereby once again possible in a simple manner to ensure that an oil quantity required for an adequate oil supply to the transmission can be held in the oil reservoir.

The retaining wall can be produced from a porous material, for example, through which the oil can be passed in the direction of the opening of the hydraulic line path. There is the possibility here for that region of the interior of the oil reservoir which is associated with the opening of the hydraulic line path to be filled only partially or to be filled completely with porous material. It is furthermore also possible to make provision for that region of the interior which is associated with the opening of the further hydraulic line path also to be filled with porous material. Here, the extent of filling of the interior of the oil reservoir with porous material of the retention device and of the oil separator can in each case be configured taking into account the intended degree of separation of the oil separator, the retention capacity of the retention device and the flow resistance caused in the interior of the oil reservoir by the porous material.

In another embodiment of the aircraft engine according to the invention which is simple in terms of design and can be operated with little complexity in terms of open-loop and closed-loop control, an inlet of the oil reservoir is connected to a perforated feed pipe of the oil separator. The perforated feed pipe comprises a pipe region which extends substantially above the retention device and a pipe elbow arranged between the inlet and the pipe region. In the region of the pipe elbow, an air-oil volume flow flowing in via the inlet can be deflected and oil can be separated from the air-oil volume flow. The pipe region is formed with a plurality of holes, from which an air-oil volume flow and oil separated out in the perforated feed pipe can be discharged.

In another embodiment of the aircraft engine according to the invention, which is distinguished by a high separating performance in the region of the oil separator, the oil separator comprises an extension of an inlet of the oil reservoir for an air-oil volume flow that can be discharged from the transmission. The extension of the inlet extends from an upper boundary wall in the direction of a lower boundary wall of the oil reservoir, through the retention device, into the oil reservoir. The air-oil volume flow flowing into the oil reservoir via the inlet can be introduced from the inlet into the oil volume stored in the oil reservoir when the extension of the inlet dips into the oil volume stored in the oil reservoir.

If the oil separator is formed with a cyclone, which is of straight design or designed to taper from an inlet of the oil reservoir for an air-oil volume flow that can be discharged from the transmission in the direction of an outlet of the cyclone, a desired prioritized supply of the hydraulic line path with the oil discharged from the transmission can be implemented in a highly efficient way.

Both the features indicated in the patent claims and the features indicated in the following illustrative embodiments of the aircraft engine according to the invention are suitable for further developing the subject matter according to the invention, either in isolation or in any combination.

Further advantages and advantageous embodiments of the aircraft engine according to the invention will emerge from the patent claims and the illustrative embodiments described in principle below with reference to the drawing, wherein, for the sake of clarity, the same reference signs are used in the description of the illustrative embodiments for components that are identical in construction and operation.

Figure 1:
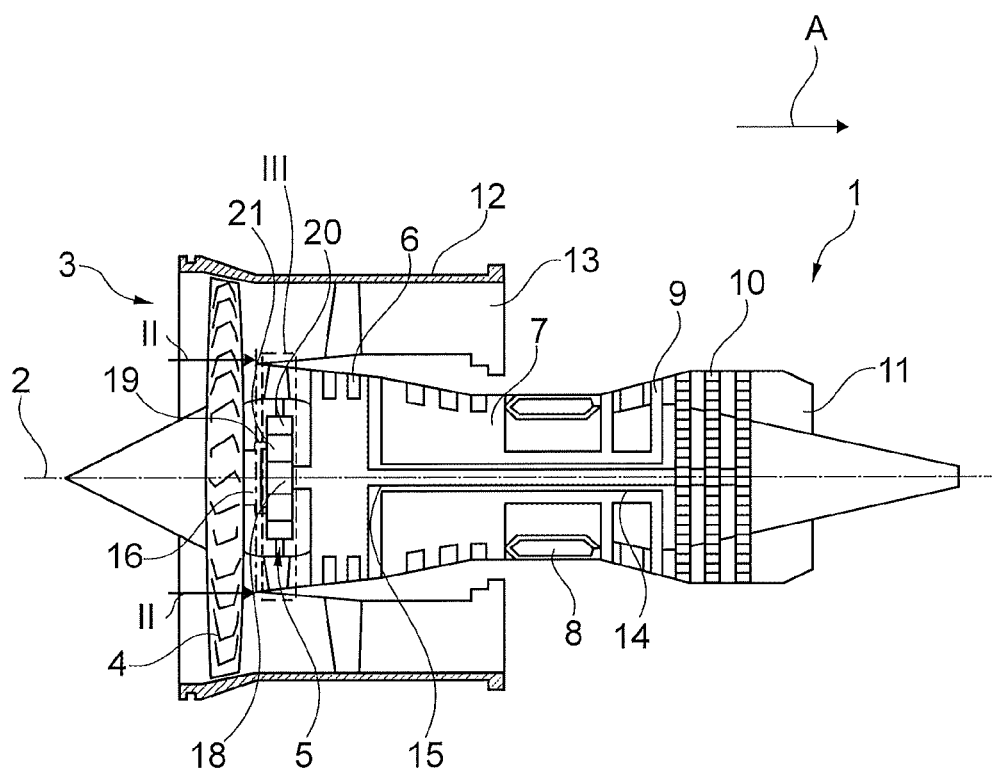
FIG. 1 shows a simplified section through an aircraft engine having a fan and a low-pressure turbine, wherein the fan is connected to the low-pressure turbine by a transmission.

FIG. 1 shows a flow machine embodied as an aircraft engine 1 of an aircraft and having a transmission 5, which is designed as a planetary transmission. The aircraft engine 1 is a turbomachine, with which the transmission 5 can advantageously be combined. It will become clear below that the transmission 5 can also be employed with turbomachines embodied in some other way, such as a propeller jet-turbine engine or turboprop.

The aircraft engine 1 has a main axis of rotation 2. In the axial flow direction A, the aircraft engine 1 furthermore comprises an air inlet 3, a fan 4, the transmission 5, a low-pressure compressor 6, a high-pressure compressor 7, a combustion device 8, a high-pressure turbine 9, a low-pressure turbine 10 and an outlet nozzle 11. An engine nacelle 12 surrounds the aircraft engine 1 and delimits the air inlet 3.

The aircraft engine 1 operates in a conventional manner, wherein air entering the air inlet 3 is accelerated by the fan 4 in order to produce two air flows. A first air flow flows into the intermediate-pressure compressor 6, and a second air flow is passed through a secondary flow duct 13 or bypass duct in order to provide thrust. The low-pressure compressor 6 compresses the air flow fed to it before the air is compressed further in the region of the high-pressure compressor 7.

The compressed air flowing out of the high-pressure compressor 7 is introduced into the combustion device 8, where mixing with fuel takes place and the fuel-air mixture is burnt. The hot combustion products which are formed expand and, in the process, drive the high-pressure turbine 9 and the low-pressure turbine 10 before being discharged via the outlet nozzle 11 in order to provide additional thrust. By means of a high-pressure shaft 14 and a low-pressure shaft 15, respectively, the high-pressure turbine 9 and the low-pressure turbine 10 drive the high-pressure compressor 7 and the low-pressure compressor 6, respectively. The low-pressure shaft 15 coupling the low-pressure turbine 10 to the low-pressure compressor 6 is coupled to the fan 4 by the transmission 5 forming a reduction gear. A drive torque applied to the transmission 5 via the low-pressure shaft 15 is raised in accordance with the stationary gear ratio of the transmission 5 and is fed to a fan shaft 16. When the fan 4 is driven by the low-pressure turbine 10, the speed of the low-pressure shaft 15 is reduced in accordance with the transmission ratio of the transmission 5, and the fan shaft 16 and the fan 4 are driven at this reduced speed and with a torque higher than the torque applied to the low-pressure shaft 15.

In the embodiment of the transmission 5 shown in FIG. 1, a sun gear of the transmission 5 is connected for conjoint rotation to the low-pressure shaft 15, and a planet carrier of the transmission 5 is connected for conjoint rotation to the fan shaft 16. An annulus of the transmission 5 is mounted in a manner fixed relative to the housing. The transmission 5 is thus embodied as an epicyclic transmission. This notwithstanding, the transmission 5 can also be embodied as some other kind of planetary transmission.

Figure 2:
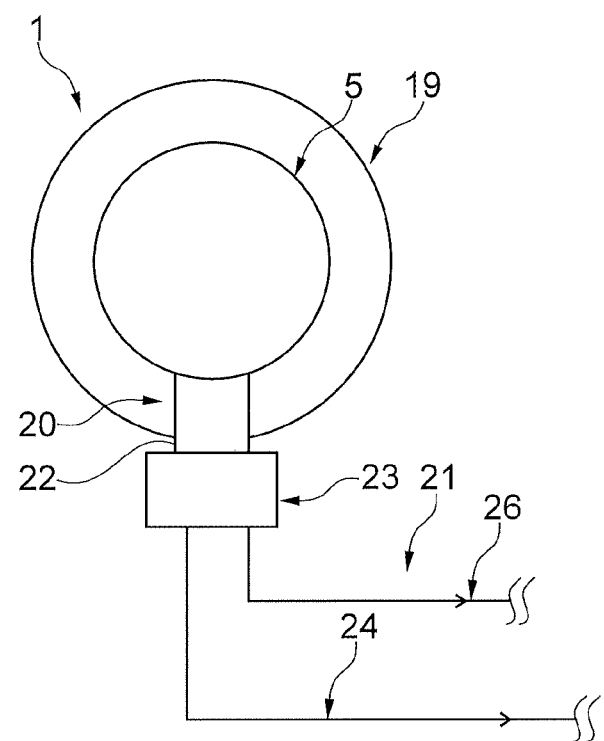
FIG. 2 shows a highly schematized cross section through the aircraft engine along a section line II-II indicated more specifically in FIG. 1.
Figure 3:
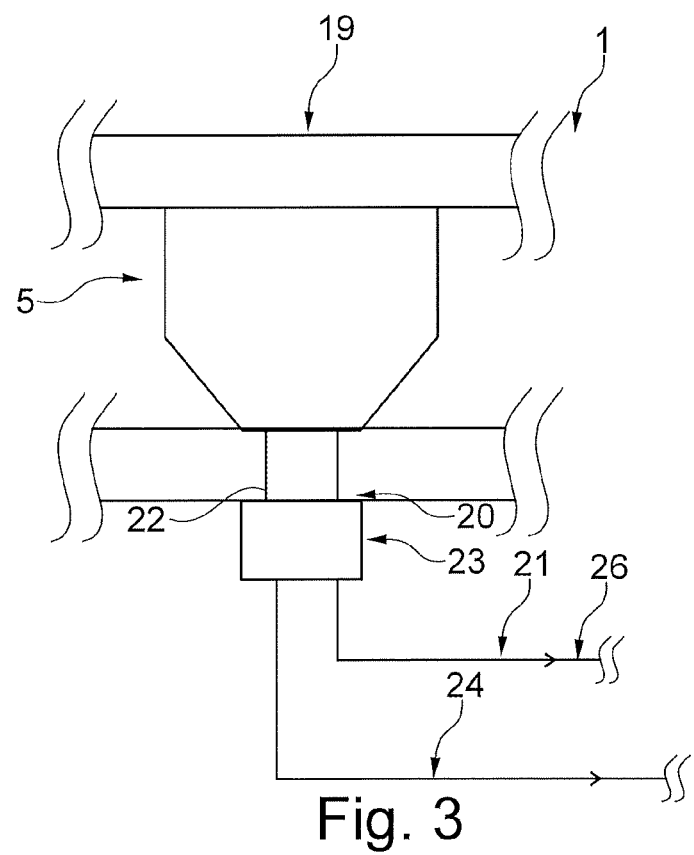
FIG. 3 shows a highly schematized illustration of a longitudinal section through a region III of the aircraft engine indicated more specifically in FIG. 1.

FIG. 2 shows a highly schematized partial cross section through the aircraft engine 1 along the section line II-II indicated more specifically in FIG. 1. From the illustration in FIG. 2, it is apparent that the transmission 5 is arranged within the core engine flow region 19 of the aircraft engine 1. A return 20 of the transmission 5, via which oil volume introduced into the transmission 5 can be fed to an oil circuit 21 of the aircraft engine 1, is connected by a strut 22 passing radially through the core engine flow region 19 to a part of the oil circuit 21 which is arranged radially outside the core engine flow region 19. FIG. 3 furthermore shows a schematized longitudinal section through a region III indicated more specifically in FIG. 1, within which the transmission 5 is arranged.

Figure 4:
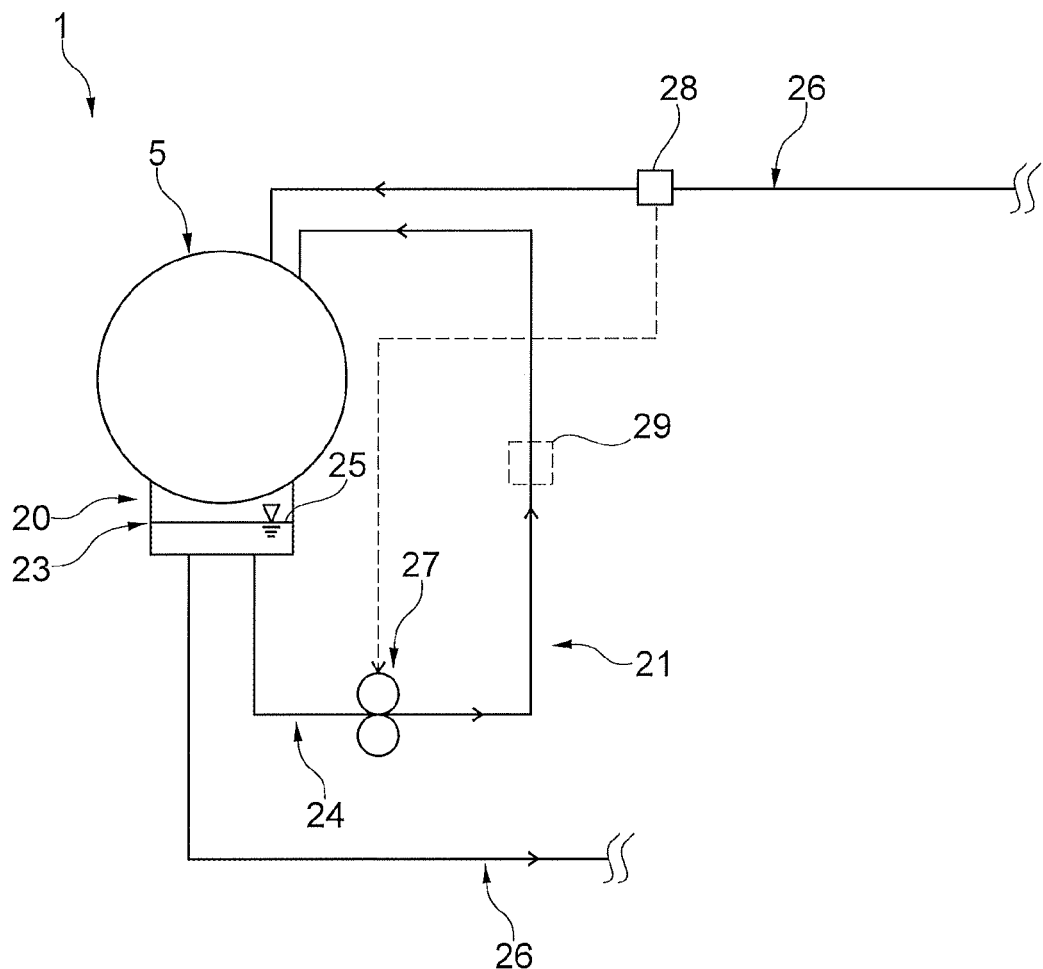
FIG. 4 shows a schematized partial illustration of an oil circuit of the aircraft engine according to FIG. 1.

In addition, a schematized partial view of the oil circuit 21 of the aircraft engine 1 is illustrated in FIG. 4. The illustration according to FIG. 4 comprises both an inlet region of the transmission 5 and the return 20 of the transmission 5. In the present case, the return 20 of the transmission 5 is in operative connection with an oil reservoir 23, from which oil can be introduced from the oil reservoir 23 directly back into the transmission 5 via a hydraulic line path 24.

Provision is made here for the oil fed to the oil reservoir 23 to be passed out of the oil reservoir 23 only in the direction of the hydraulic line path 24 below a defined filling level 25 of the oil reservoir 23. When the defined filling level 25 of the oil reservoir 23 is reached, oil is also introduced from the oil reservoir 23 into a further hydraulic line path 26.

In the present case, the hydraulic line path 24 is formed by a pump 27, which, in the delivery mode, draws in oil from the oil reservoir 23 and pumps it back directly into the transmission 5 via the hydraulic line path 24. In the present case, the further hydraulic line path 26 corresponds substantially to a main oil circuit of the aircraft engine 1, via which various regions of the aircraft engine 1, such as the transmission 5 and bearing units of the aircraft engine 1, are supplied with oil.

In the present case, the pump 27 is driven via the transmission 5, wherein the operative connection between the transmission 5 and the pump 27 is of switchable design. In this case, the pump 27 is only driven by the transmission 5 when an inadequate supply of oil is detected from the further line path 26. Such an undersupplied operating state of the transmission 5 from the further hydraulic line path 26 can be detected, for example, by means of a sensor 28, by means of which a feed pressure or a fluid volume flow in the inlet region of the transmission 5 of the further hydraulic line path 26 or some other suitable operating variable of the aircraft engine 1 can be determined.

In addition, provision can also be made for the switchable operative connection between the transmission 5 and the pump 27 to be activated in accordance with other operating variables of the aircraft engine 1 by means of which an undersupplied state of the transmission 5 with oil from the further hydraulic line path 26 can be detected.

As a departure from this, it is also possible to provide for the pump 27 to be driven electrically, wherein the electric drive of the pump 27 is activated to the same extent as the mechanical operative connection between the transmission 5 and the pump 27 when required. In addition, there is also the possibility of embodying the hydraulic line path 24 with a cooler 29 to enable the oil volume circulating through the hydraulic line path 24 to be temperature-controlled to the desired extent.

Figure 5:
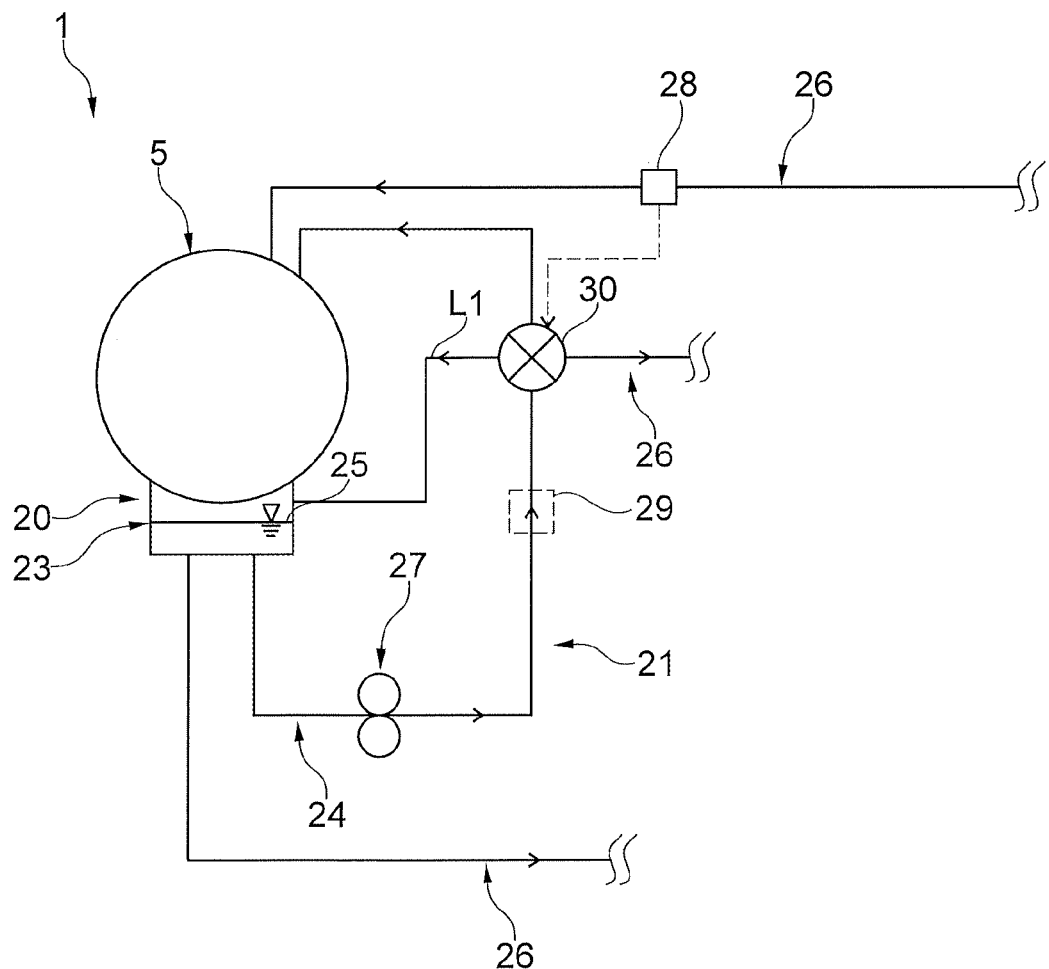
FIG. 5 shows an illustration corresponding to FIG. 4 of another embodiment of the oil circuit of the aircraft engine according to FIG. 1.

An illustration corresponding to FIG. 4 of another embodiment of the aircraft engine 1 is shown by FIG. 5, in which the pump 27 is driven continuously by the transmission 5 or by an electric drive. Here, there is once again the possibility of coupling the pump 27 mechanically to the transmission 5 or of driving it electrically. This embodiment of the aircraft engine 1 is embodied with a valve unit 30 which, once again, can be actuated in accordance with one or more of the abovementioned operating variables of the aircraft engine 1, on the basis of which an undersupplied operating state of the transmission 5 from the further hydraulic line path 26 can be detected.

In the normal operating state of the aircraft engine 1, during which the transmission 5 is supplied to a sufficient extent with oil from the hydraulic line path 26, the valve unit 30 is put into an operating state in which oil volume taken from the oil reservoir 23 by the pump 27 is fed into the further hydraulic line path 26. In contrast, the oil volume delivered by the pump 27 is directed in the direction of the transmission 5 in the region of the valve unit 30 from the further hydraulic line path 26 during an undersupplied operating state of the transmission 5 to enable an adequate supply of oil volume to the transmission 5 to be ensured.

In addition or as an alternative, there is also the possibility for the oil volume flow pumped by the pump 27 in the direction of the valve unit 30 to be passed at least partially via a line L1 from the valve unit 30 in the direction of the return 20 or of the oil reservoir 23.

Depending on the respective application under consideration, there is the possibility of the oil reservoir 23, the pump 27, the valve unit 30 and/or the sensor 28 being arranged within or outside the housing of the transmission 5, wherein, in the case of arrangement in the housing of the transmission 5, oil losses caused by leaks in the region of the oil reservoir 23, the pump 27, the valve unit 30 and/or the sensor 28, respectively, are avoided since the leakage oil volume flows are collected within the transmission 5 and introduced back into the oil reservoir 23 via the return 20 of the transmission 5.

Figure 6:
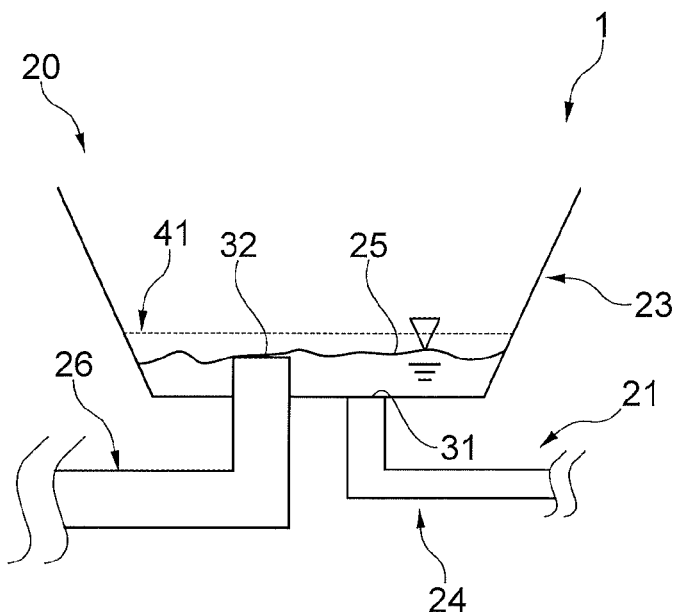
FIG. 6 shows a highly schematized illustration of part of the oil circuit of the aircraft engine having an oil reservoir.

A highly schematized illustration of the oil reservoir 23 is shown in FIG. 6. In this embodiment of the oil reservoir 23, an opening 31 of the hydraulic line path 24 for the removal of oil from the oil reservoir 23 is arranged below the defined filling level 25 in the oil reservoir 23. An opening 32 of the further hydraulic line path 26 for the removal of oil from the oil reservoir 23 is furthermore arranged at the level of the defined filling level 25 of the oil reservoir 23.

Figure 7:
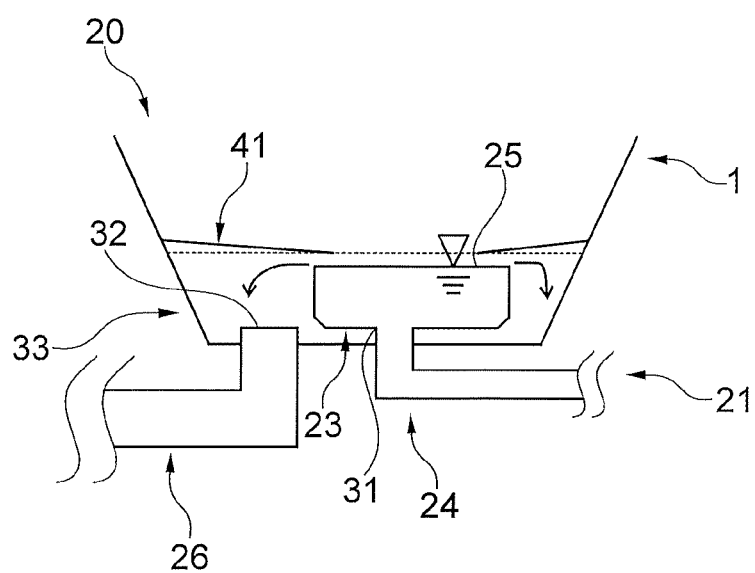
FIG. 7 shows an illustration corresponding to FIG. 6 of another illustrative embodiment of the oil circuit of the aircraft engine having an oil reservoir and having a further oil reservoir.

In contrast, the further hydraulic line path 26 in the illustrative embodiment of the oil circuit 21 which is illustrated in FIG. 7 comprises a transfer region 33, into which oil can be introduced from the oil reservoir 23 once the defined filling level 25 of the oil reservoir 23 has been reached. In the embodiment of the oil circuit 21 which is illustrated in FIG. 7, the oil reservoir 23 is completely full when the defined filling level 25 is reached, and therefore, if additional oil flows into the oil reservoir 23, the oil reservoir 23 overflows. Oil volume flowing out of the oil reservoir 23 then flows in the direction of the transfer region 33 of the further hydraulic line path 26, in which the oil reservoir 23 is fully arranged in the illustrative embodiment shown in FIG. 7.

In this case, the inlet of the oil reservoir 23 and also the inlet of the transfer region 33 are designed in such a way that the oil volume carried in the direction of the oil reservoir 33 via the return 20 of the transmission 5 is initially introduced only into the oil reservoir 23 and, once the defined filling level 25 has been reached, also flows off in the direction of the transfer region 33.

FIG. 8 to FIG. 19B each show different embodiments of the oil circuit 21, which each differ only in partial areas from the illustrative embodiment of the oil circuit 21 which is shown in FIG. 6. For this reason, in the following description only the differences between the respectively considered embodiment and the embodiment of the oil circuit 21 according to FIG. 6 relating to FIG. 8 to FIG. 19B are explored in detail and, in respect of the mode of operation in other respects, reference is made to the description relating to FIG. 6.

Figure 8:
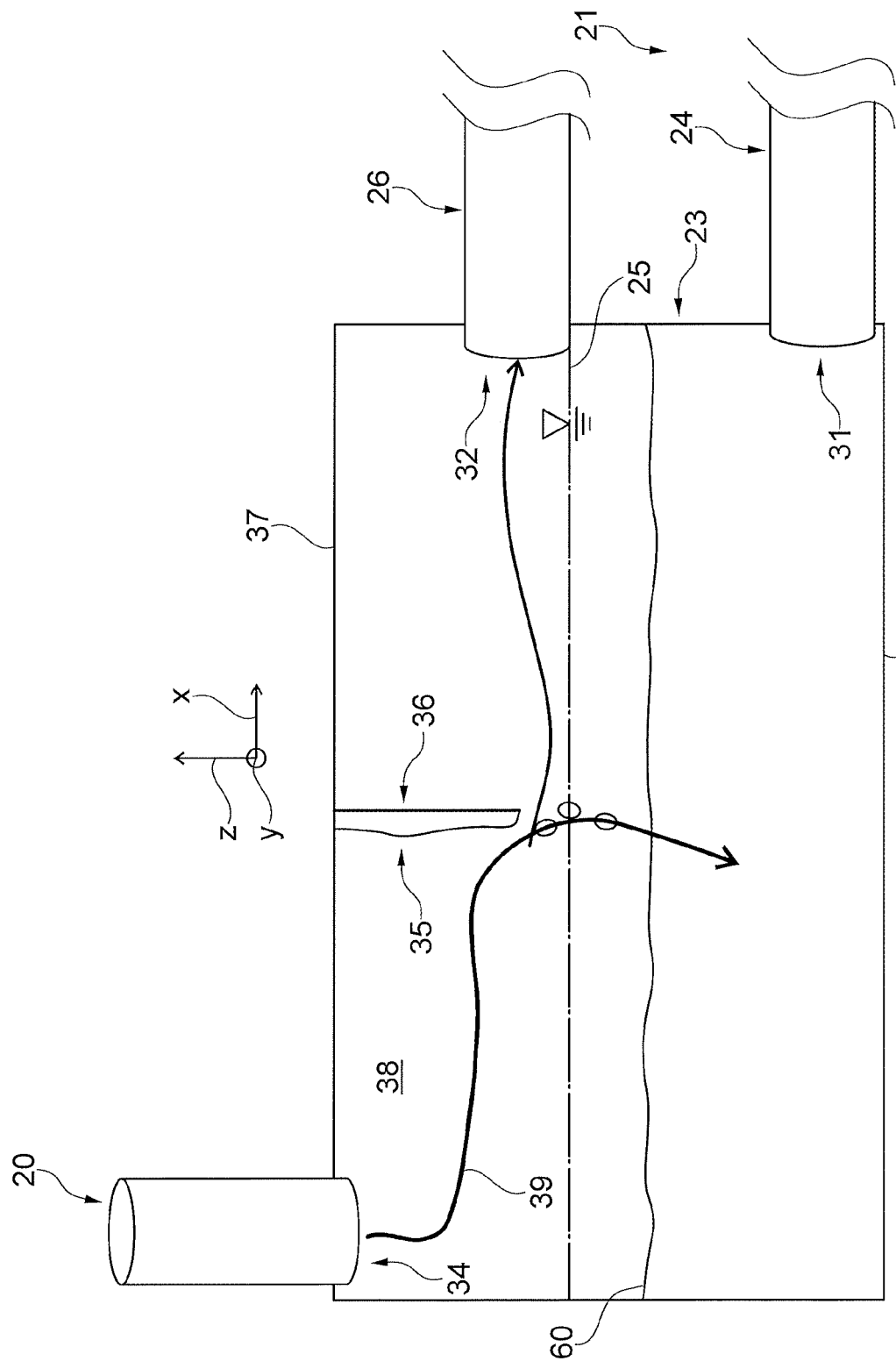
FIG. 8 to FIG. 24 show various more detailed illustrations of the region of the aircraft engine which is illustrated schematically in FIG. 6.

In the illustrative embodiment of the oil circuit 21 which is illustrated in FIG. 8, an oil separator 35 is provided in the oil reservoir 23 between an inlet 34 for the oil discharged from the transmission 5 and the opening 32 of the further hydraulic line path 26. The oil separator 35 comprises an inertial separator 36, which in the present case is designed as a baffle. In the present case, the baffle 36 is arranged so as to extend in the oil reservoir 23 parallel to a yz plane of the oil reservoir 23. In addition, the baffle 36 extends from a boundary wall 37 that is at the top in the installation position of the oil reservoir 23 in the aircraft engine 1 into an interior 38 of the oil reservoir 23. In this case, the baffle 36 is arranged in a flow path of an air-oil volume flow 39 flowing via the inlet 34 into the interior 38 of the oil reservoir 23 in the direction of the opening 32 of the further hydraulic line path 26. During an operating state of the oil circuit 21 which is illustrated in FIG. 8, during which the opening 31 is completely covered with oil, the air-oil volume flow 39 flows preferentially in the direction of the opening 32 of the further hydraulic line path 26.

During this process, oil droplets carried along in the air-oil volume flow 39 separate out in the region of the baffle 36 when they strike the baffle 36. Owing to the force of gravity acting on the oil volume separated out, the oil film that forms during operation on the side of the baffle 36 which faces the inlet 34 flows off in the direction of a lower boundary wall 40 of the oil reservoir. Downstream of the baffle 36, the air-oil volume flow flows with a lower oil content in the direction of the opening 32 of the further hydraulic line path 26 and, through the latter, out of the oil reservoir 23.

Figure 9:
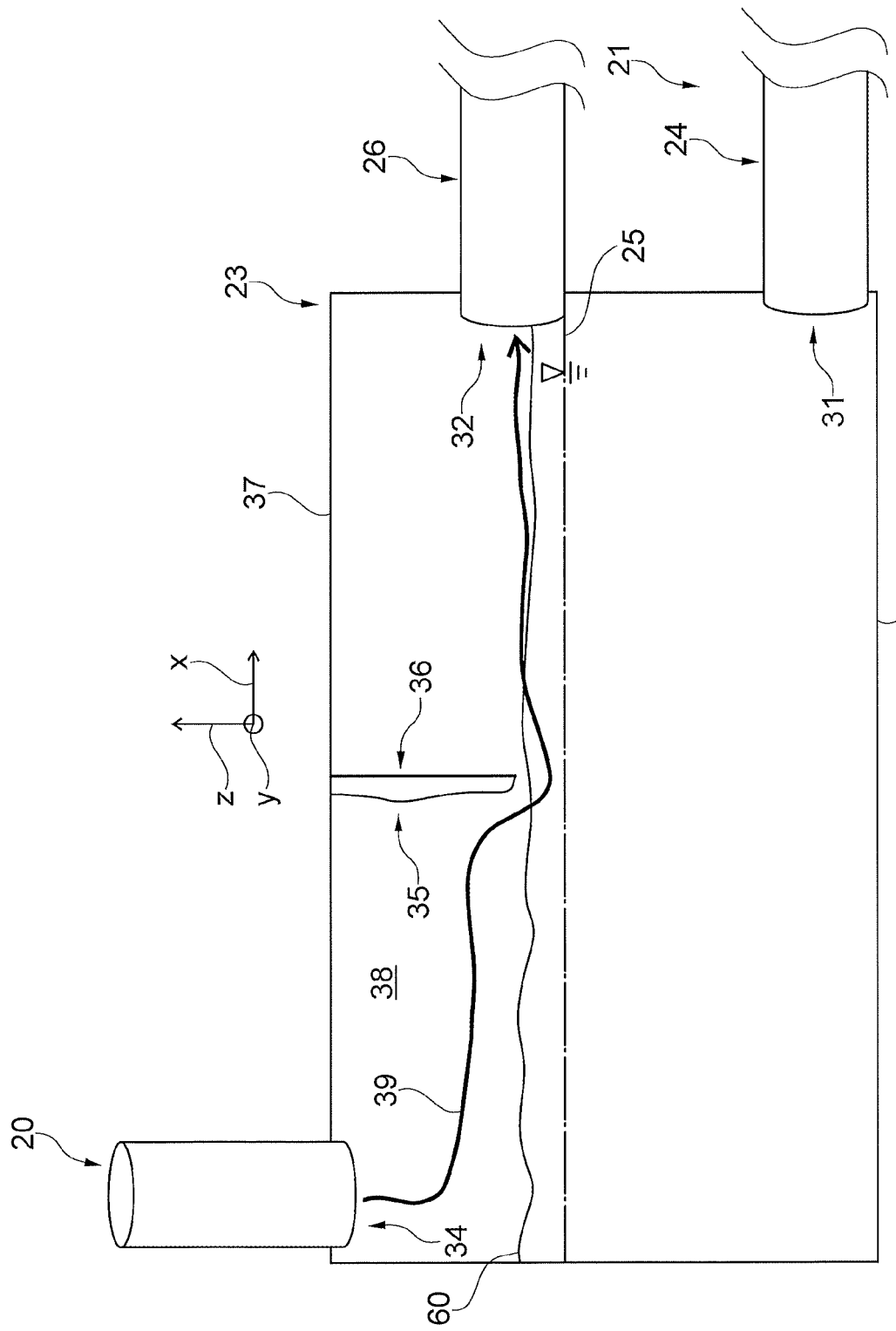

The oil separator 35 ensures that the oil introduced into the oil reservoir 23 from the return 20 is fed substantially only to the hydraulic line path 24 until the defined filling level 25 is reached. If the current oil level 60 of the oil reservoir 23 exceeds the defined filling level 25, then, in addition to the air-oil volume flow 39, oil is additionally also fed from the oil reservoir 23 into the further hydraulic line path 26. This operating state of the oil circuit 21 is shown in FIG. 9.

Figure 10:
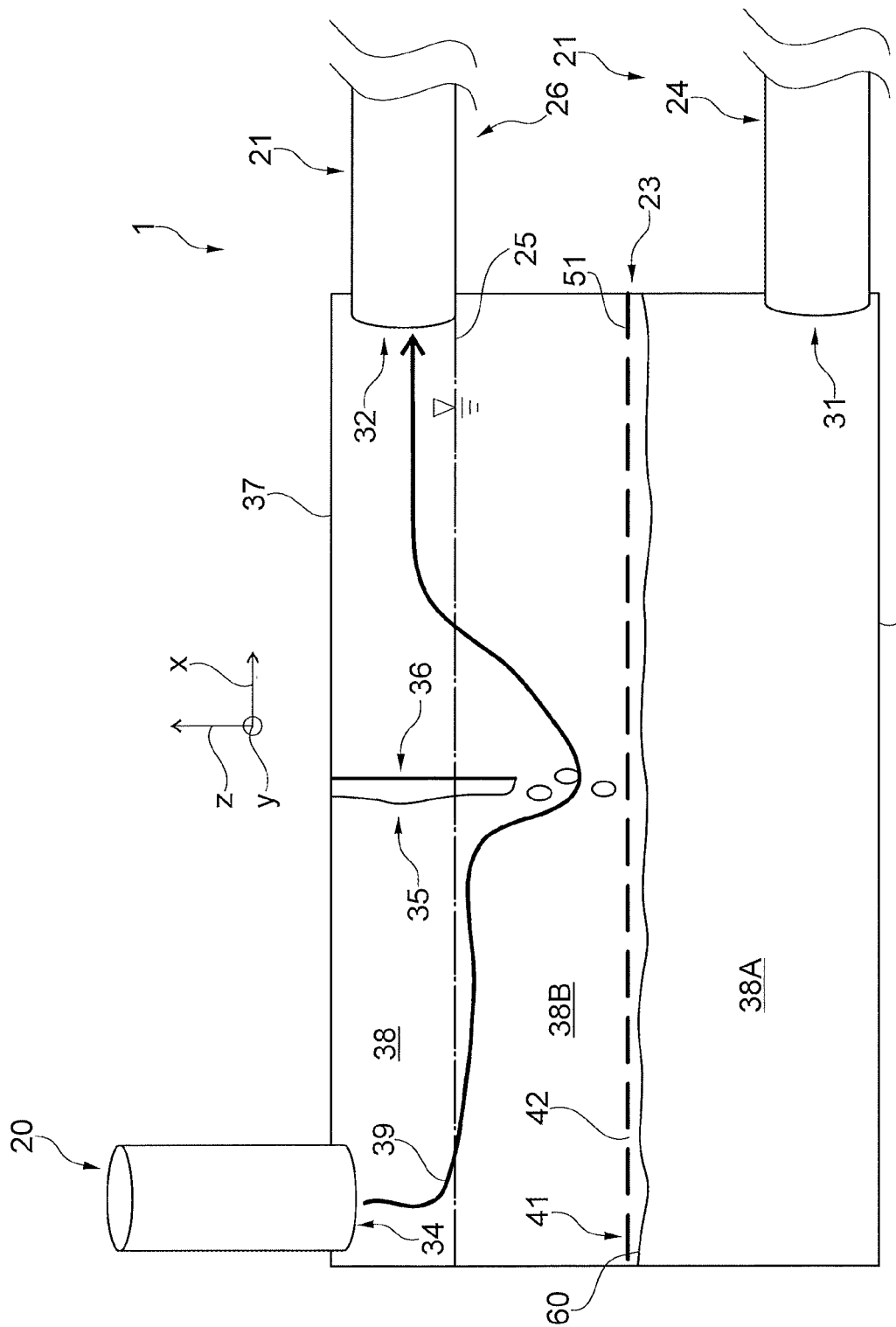

In the illustrative embodiment of the oil circuit 21 which is shown in FIG. 10, a retention device 41 is additionally arranged in the oil reservoir 23 in addition to the oil separator 35. In this case, the retention device 41 is arranged in the interior 38 of the oil reservoir 23 in such a way as to extend parallel to an xy plane of the oil reservoir 23 and divides the interior 38 into a lower inner region 38A and an upper inner region 38B. The retention device 41 is embodied with a perforated retaining wall 51, which is mounted substantially horizontally in the oil reservoir 23 and is formed with apertures 42 over the entire area. Via the apertures 42, oil passes out of the inner region 38B, which in the present case is connected to the inlet 34 and the opening 32 of the further hydraulic line path 26, into the lower inner region 38A of the oil reservoir 23, into which the hydraulic line path 24 opens. The perforated retaining wall 51 of the retention device 41 ensures that oil volume present in the lower inner region 38A is not discharged from the oil reservoir 23 to an unwanted extent via the opening 32 in the direction of the further hydraulic line path 26 while the oil reservoir is in a sloping position, when there is zero gravity or when there are negative G forces occurring in flight and acting on the oil volume, e.g. during a sudden loss of altitude of an aircraft.

Figure 11:
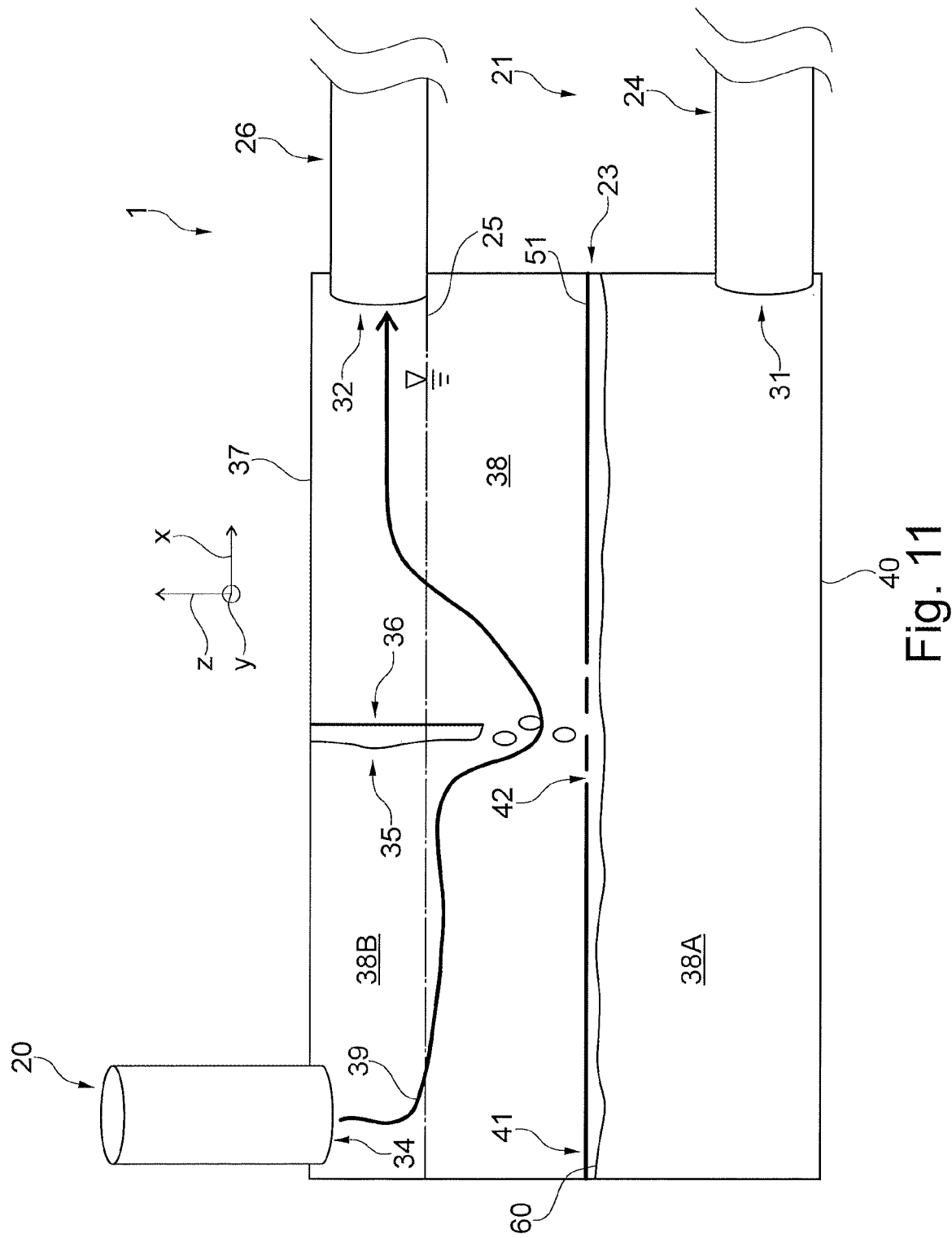

In contrast to the embodiment of the oil circuit 21 which is illustrated in FIG. 10, the retention device 41 or perforated retaining wall 51 in the embodiment shown in FIG. 11 is formed by apertures 42 only in the region below the oil separator 35. This is a simple way of providing greater security of retention for the oil volume present in the lower inner region 38A.

Figure 12:
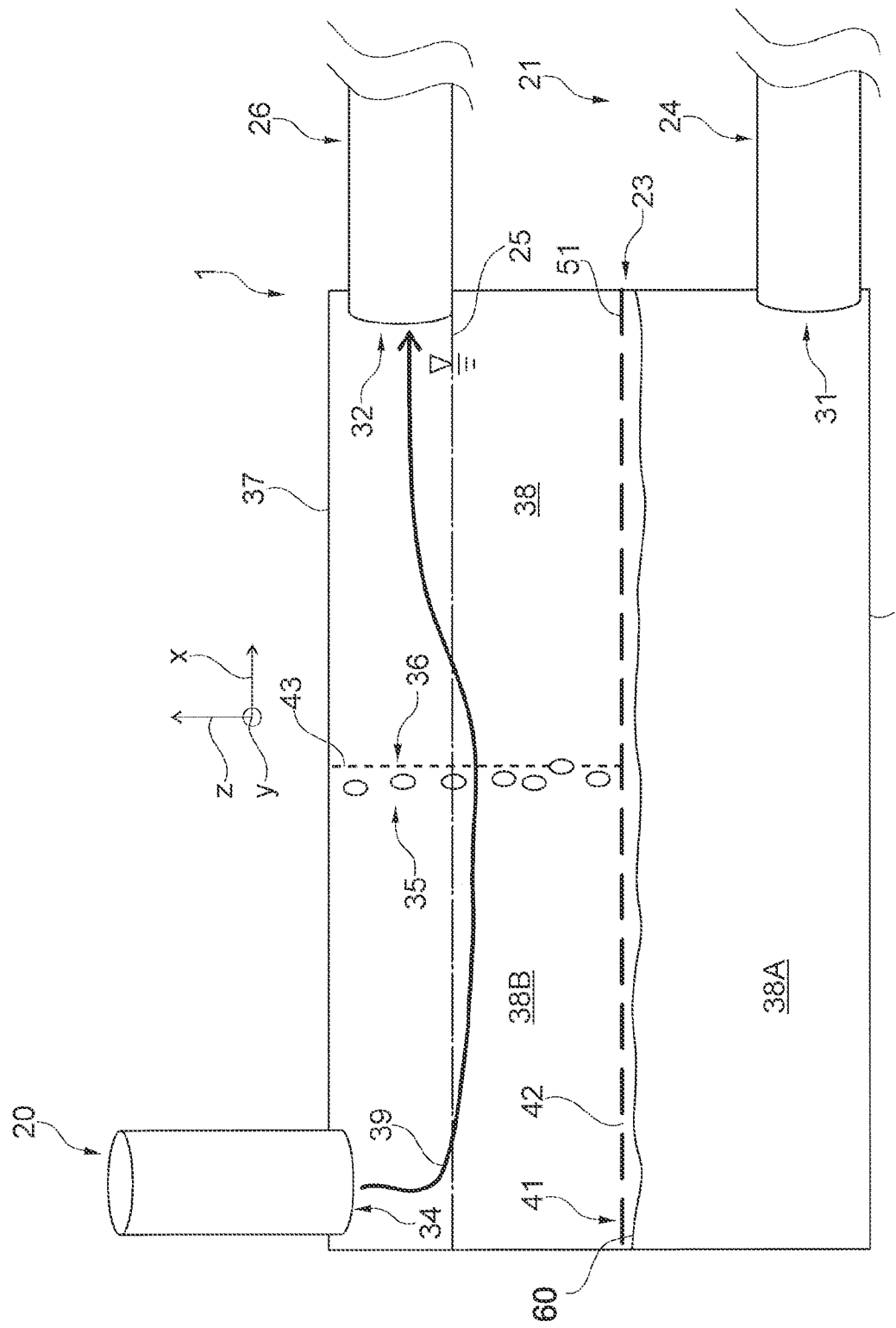

Another embodiment of the oil circuit 21 is shown by FIG. 12, in which the oil separator 35 has a perforated baffle 36 extending from the upper boundary wall 37 to the retention device 41. The perforated baffle 36 is formed with apertures 43, through which the air-oil volume flow flowing through the inlet 34 into the interior 38 or upper inner region 38B can be carried in the direction of the opening 32 of the further hydraulic line path 26. Here, the apertures 43 are dimensioned in such a way that sufficient oil is separated out of the air-oil volume flow flowing in via the inlet 34 in the region of the oil separator 35, and the oil volume separated out flows off into the lower inner region 38A via the retention device 41.

Figure 13:
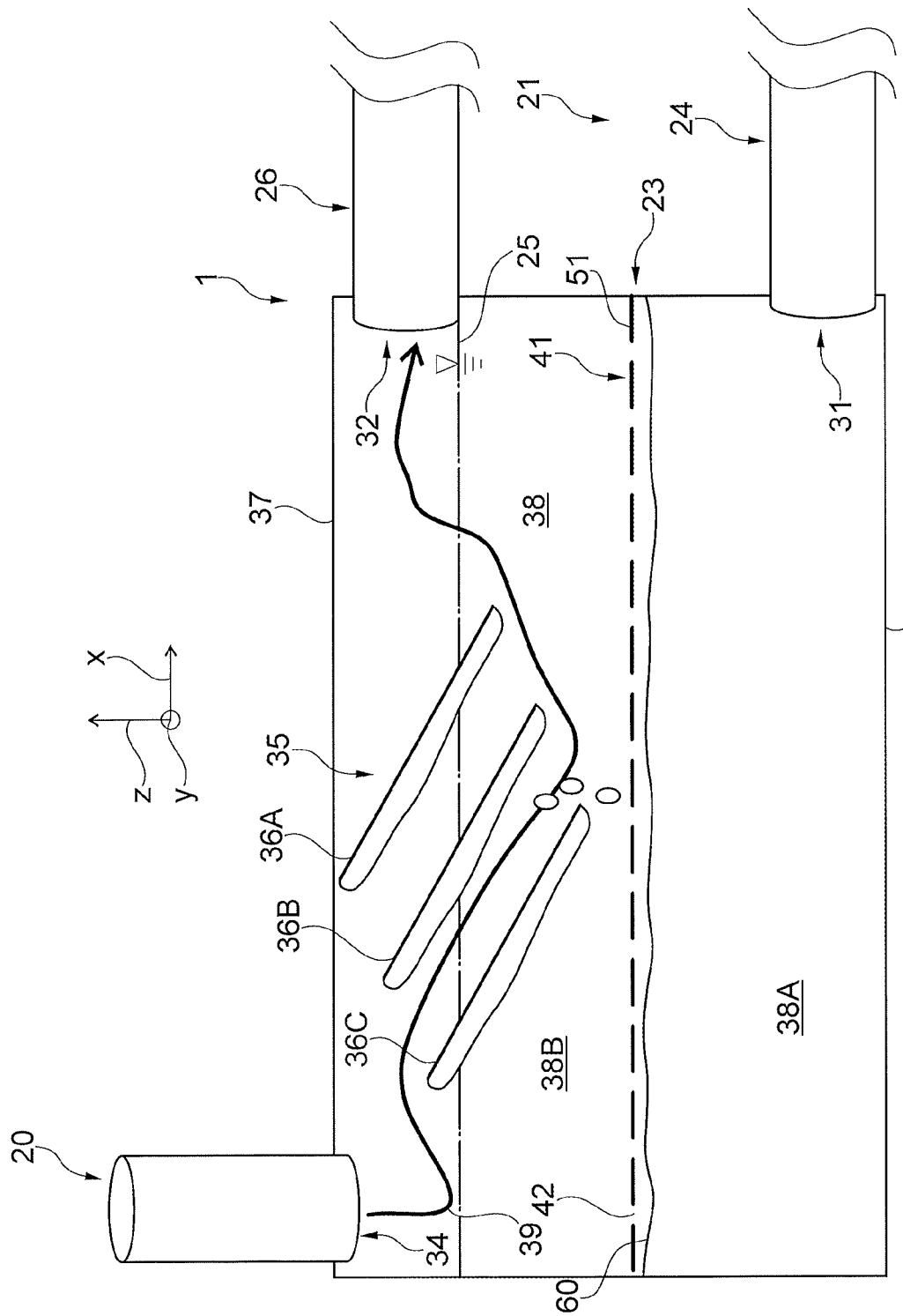

In the illustrative embodiment of the oil circuit 21 which is shown in FIG. 13, the oil separator 35 comprises a plurality of baffles 36A to 36C, which slope relative to the yz plane. In this case, the slope of the baffles 36A to 36C is such that regions of the baffles 36A to 36C which are closer to the inlet 34 are further away from the retention device 41 in the z direction than regions of the baffles 36A to 36C which are remote from the inlet 34. This ensures that the air-oil volume flow flowing via the inlet 34 into the interior 38 or into the upper inner region 38B of the oil reservoir 23 is guided along the baffles 36A to 36C from the upper boundary wall 37 in the direction of the retention device 41 and thus of the lower inner region 38A, and the oil volume separated out in the region of the baffles 36A to 36C is guided in the direction of the opening 31 of the hydraulic line path 24 by the air-oil volume flow in addition to the effective gravitational force.

Figure 14:
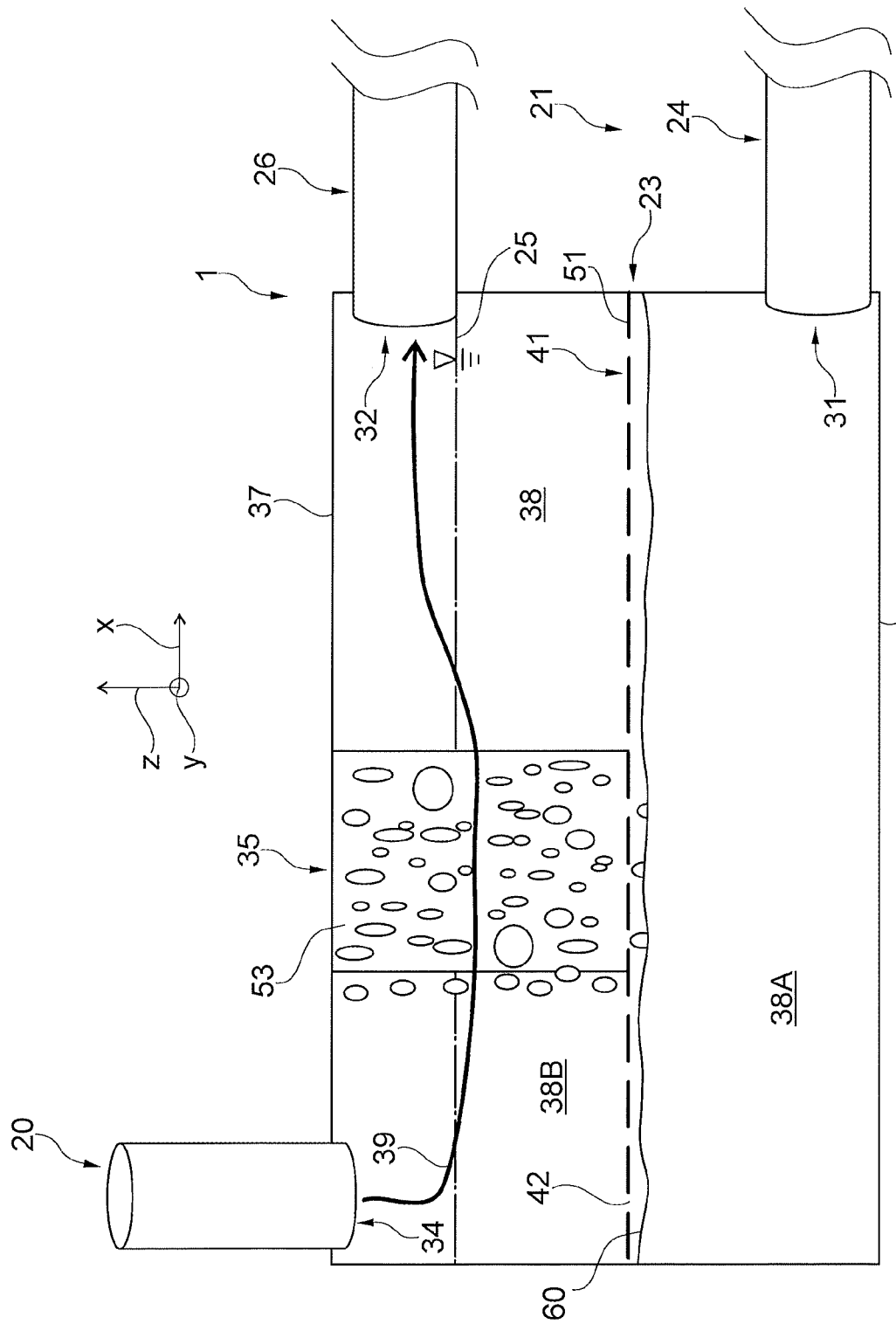

In the illustrative embodiment of the oil circuit 21 which is shown in FIG. 14, the oil separator 35 is formed with a porous medium 53. In this case, the porous medium 53 is embodied in such a way that the air-oil volume flow can be guided from the inlet 34 in the direction of the opening 32 of the further hydraulic line path 26 through the porous medium 53. While flowing through the porous medium 53, a large proportion of the oil carried along by the air-oil volume flow is separated out and flows off in the direction of the lower inner region 38A of the oil reservoir 23 owing to the effective gravitational force.

Figure 15:
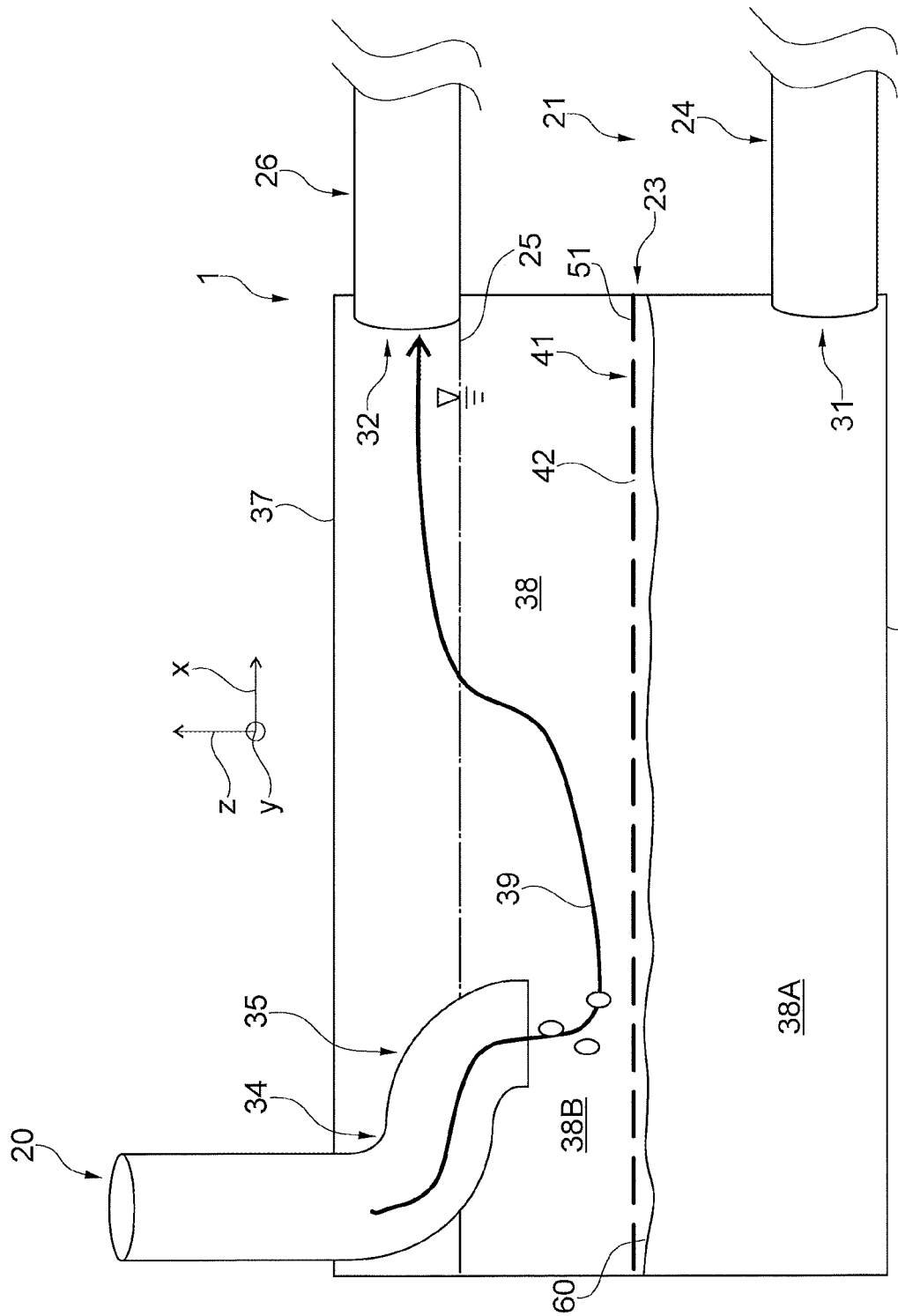

The illustrative embodiment of the oil circuit 21 which is shown in FIG. 15 is formed with an oil separator 35 that is connected to the inlet 34 and comprises a substantially S-shaped line region 44 as an inertial separator 36. Owing to the S-shaped configuration of the line region 44 and the double deflection of the flow thereby achieved, the oil volume droplets which are each carried along by the air-oil volume flow and which have a higher inertia than the air flow are deposited on the inside of the line region 44 and flow out of the line region 44 in the direction of the lower inner region 38A of the oil reservoir 23 in the manner illustrated. The air-oil volume flow flowing out of the line region, which has a lower oil content than the air-oil volume flow introduced into the oil reservoir 23 via the inlet 34, flows in the direction of the opening 32 of the further hydraulic line path 26.

Figure 16:
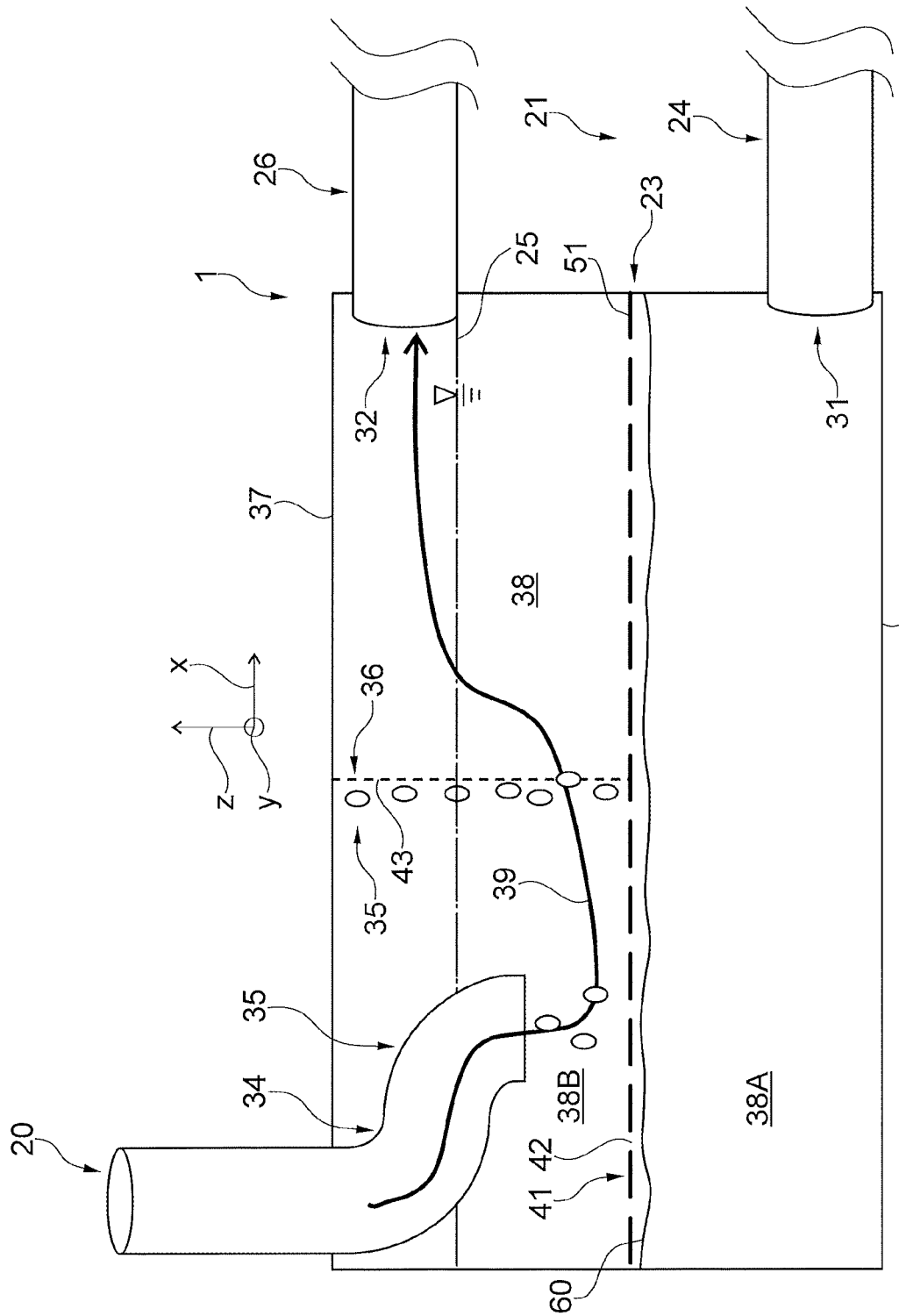
Figure 17:
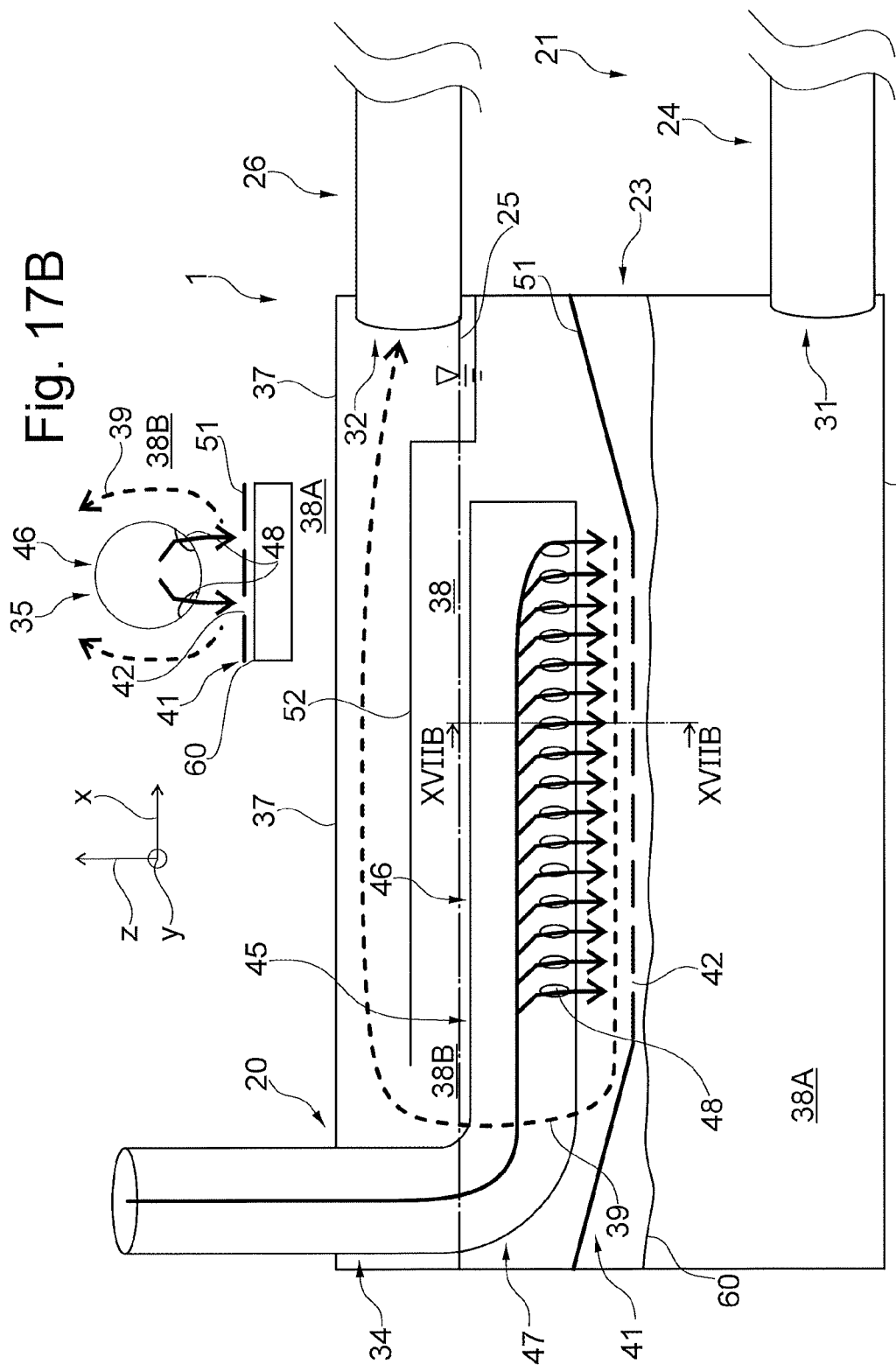

FIG. 16 shows a development of the embodiment of the oil circuit 21 which is illustrated in FIG. 15, this embodiment additionally being embodied with a perforated baffle 36, as described in relation to FIG. 12, having apertures 43.

In the illustrative embodiment of the oil circuit 21 which is illustrated in FIG. 17A, the inlet 34 is connected to a perforated feed pipe 45 of the oil separator 35. FIG. 17B shows a partial cross section through the oil separator 35 along the section line XVIIB-XVIIB indicated more specifically in FIG. 17A. The perforated feed pipe 45 comprises a pipe region 46 which extends substantially in the x direction in the interior 38 above the retention device 41 and a pipe elbow 47 arranged between the inlet 34 and the pipe region 46. In the region of the pipe elbow 47, the air-oil volume flow flowing in via the inlet 34 is deflected substantially through 90°, and oil is separated out of the air-oil volume flow owing to the higher inertia. In its region facing the lower inner region 38A, the pipe region 46 is formed with a plurality of holes or outlets 48, from which an air-oil volume flow and oil separated out in the perforated feed pipe 45 is discharged. Following this, an air-oil volume flow having a lower oil content than the air-oil volume flow introduced via the inlet 34, flows in the direction of the opening 32 of the further hydraulic line path 26 between the upper boundary wall 37 and a flow guiding device 52 extending substantially in the X direction in the upper inner region 38B.

Figure 18:
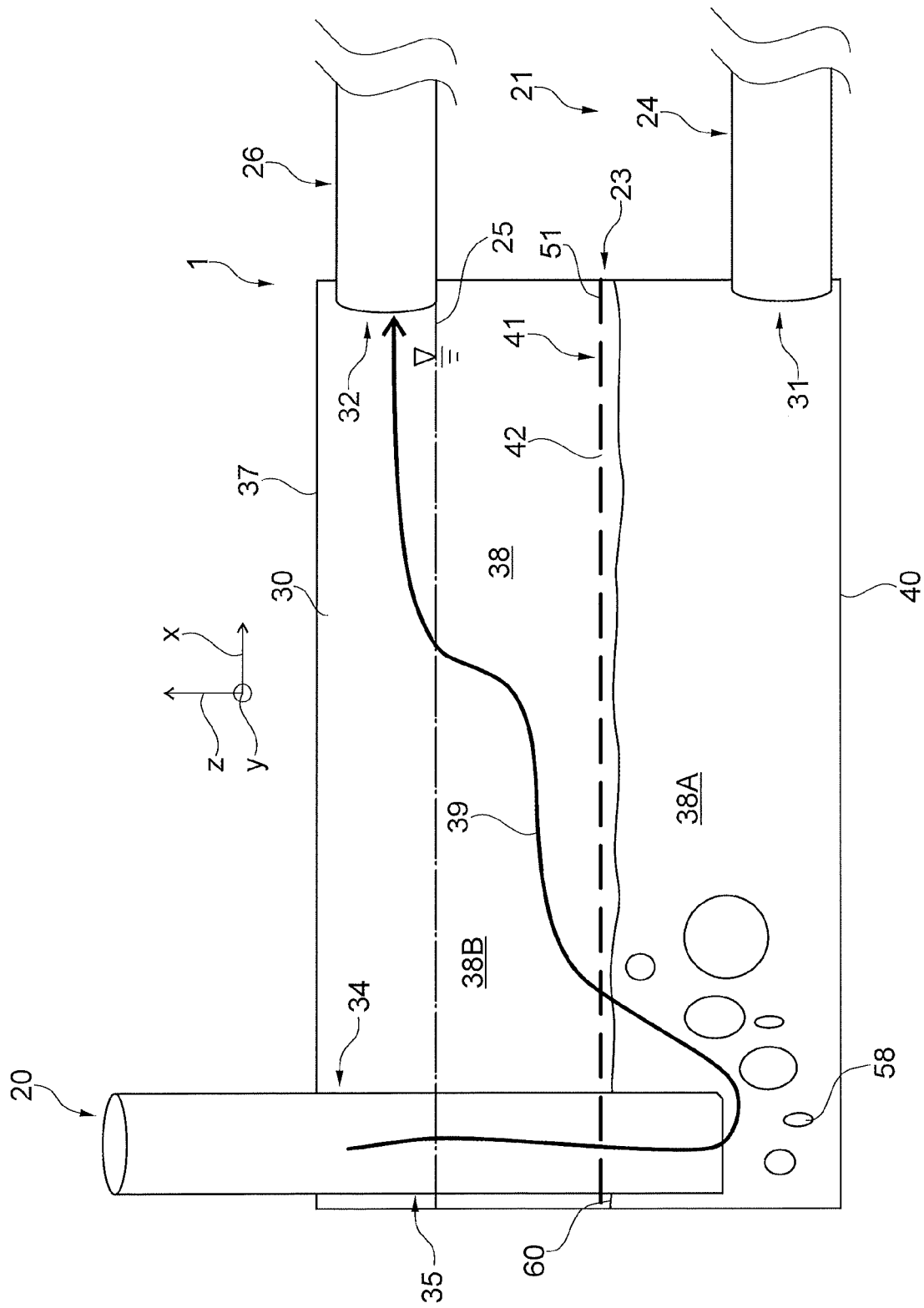

In the embodiment of the oil circuit 21 which is illustrated in FIG. 18, the oil separator 35 forms an extension of the inlet 34 in the z direction, which extends through the retention device 41 from the upper boundary wall 37 in the direction of the lower boundary wall 40 into the lower inner region 38A. If there is a filling level 60 of the oil reservoir 23, as shown in FIG. 18, the air-oil volume flow introduced into the oil reservoir 23 via the inlet 34 is in this case introduced into the oil volume stored in the oil reservoir 23. Owing to its lower density, the air then rises in the form of bubbles 58 in the stored oil volume in the direction of the upper boundary wall 37 in order then to flow through the retention device 41 in the direction of the opening 32 of the further hydraulic line path 26.

Figure 19:
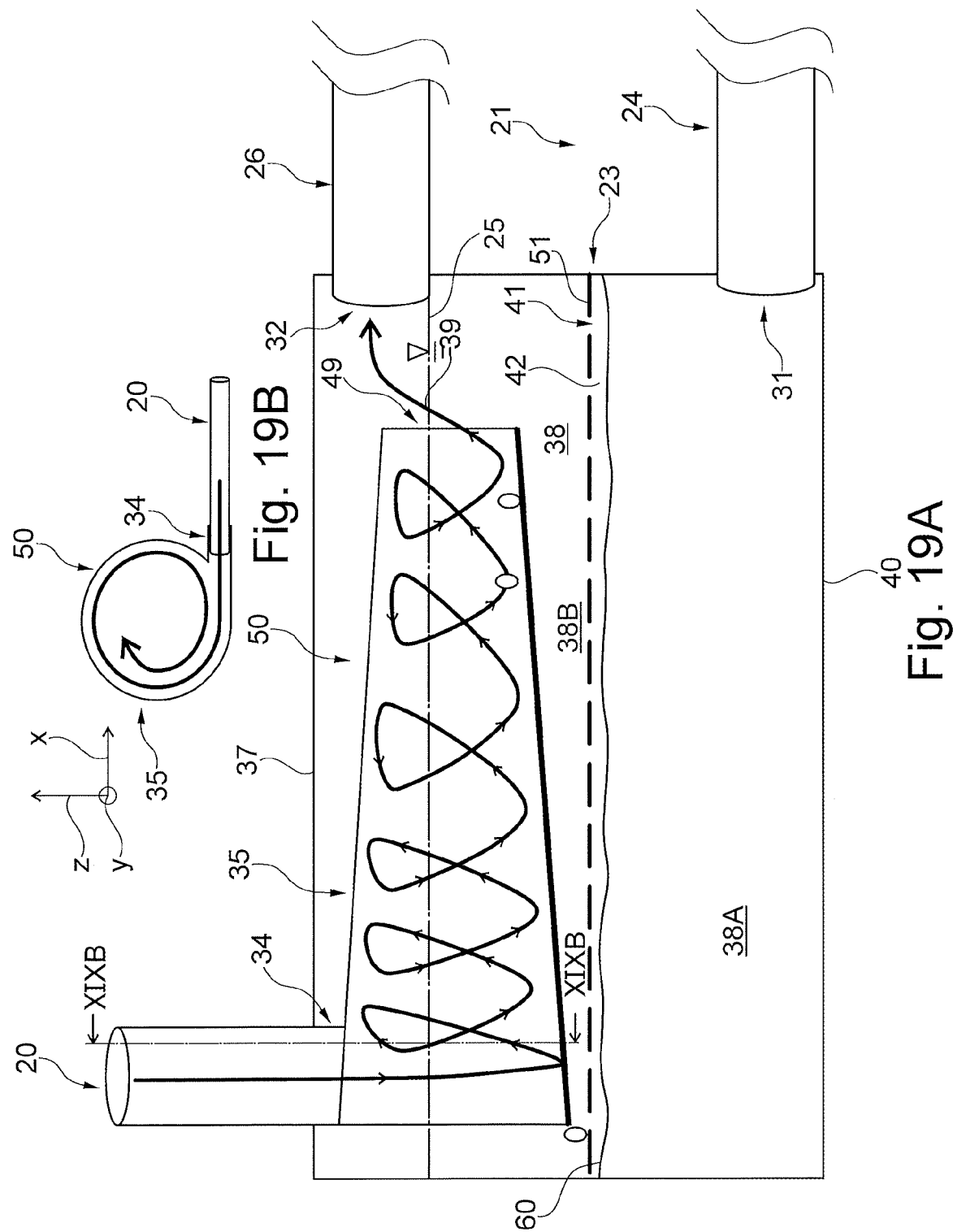

Another embodiment of the oil circuit 21 is shown by FIG. 19A, in which the oil separator 35 is designed as a cyclone. FIG. 19B shows a section through the inlet 34 and through the cyclone 50 along a section line XIXB-XIXB indicated more specifically in FIG. 19A. Here, there is the possibility that the cyclone is of straight design or, as illustrated, is designed to taper from the inlet 34 in the direction of an outlet 49 of the cyclone 50. The air-oil volume flow flowing directly into the cyclone 50 of the oil separator 35 via the inlet 34 flows through the cyclone 50 in a spiral, in the manner illustrated in FIG. 19, as a result of which oil volume increasingly separates out in the lower region of the cyclone 50 and flows out of the cyclone 50 in the direction of the lower inner region 38A of the oil reservoir 23. The air-oil volume flow flowing out of the cyclone 50, which has a lower oil content than the air-oil volume flow flowing into the oil reservoir 23 via the inlet 34, flows out of the oil reservoir 23 into the further hydraulic line path 26.

Figure 20:
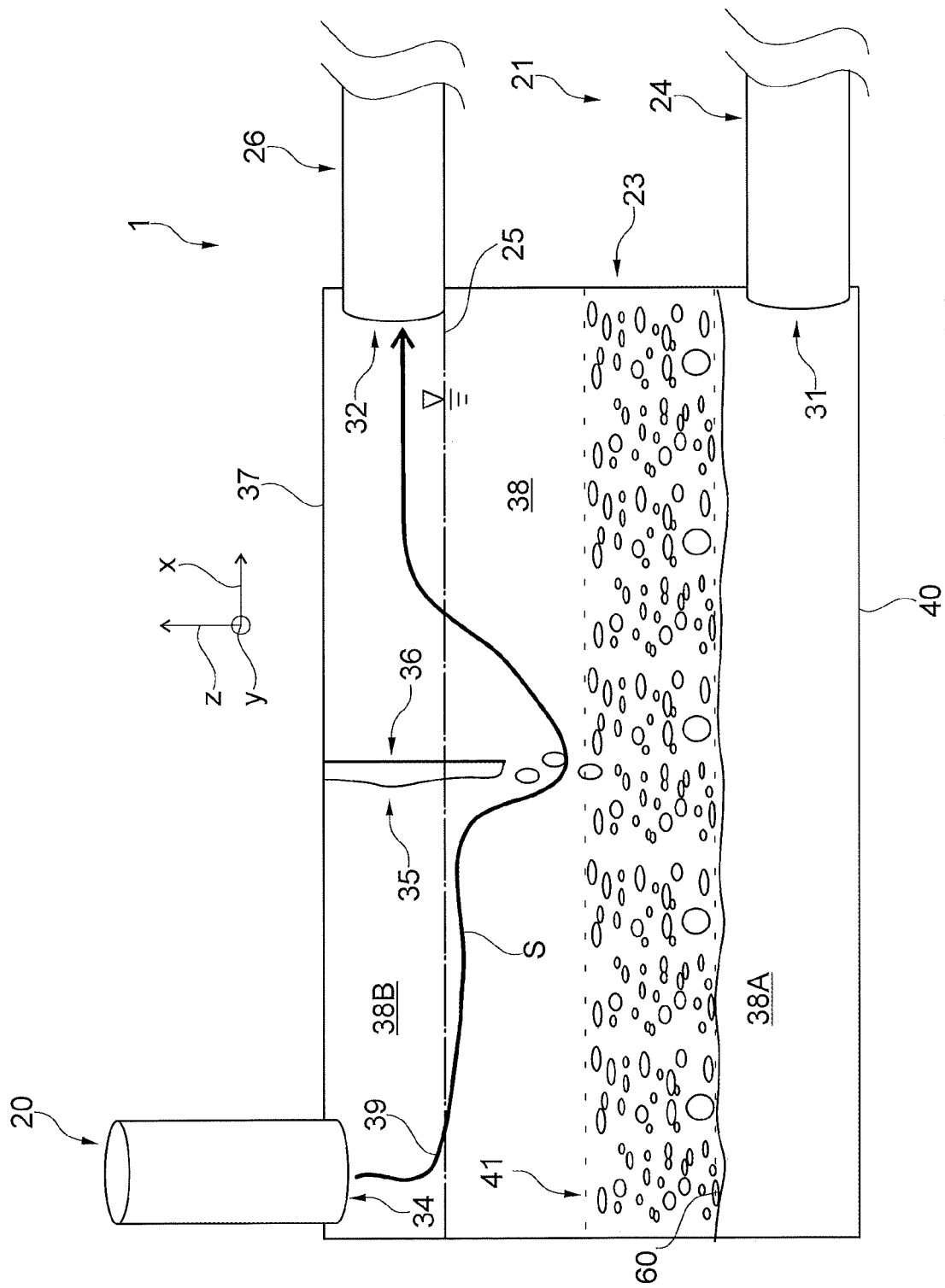

FIG. 20 shows another embodiment of the oil circuit 21, which corresponds substantially to the illustrative embodiment shown in FIG. 10 and which differs only in the region of the retention device 41 in that the retention device 41 is produced from porous material. The porous material of the retention device 41 extends substantially over the entire cross section of the oil reservoir 23 and separates region 38A of the interior 38 from region 38B in a desired manner and is permeable for oil. Here, the flow resistance for the oil in the region of the porous material is such that oil can be transferred from region 38B to region 38A but, conversely, a spontaneous return flow of large quantities of oil from region 38A into region 38B is prevented.

Figure 21:
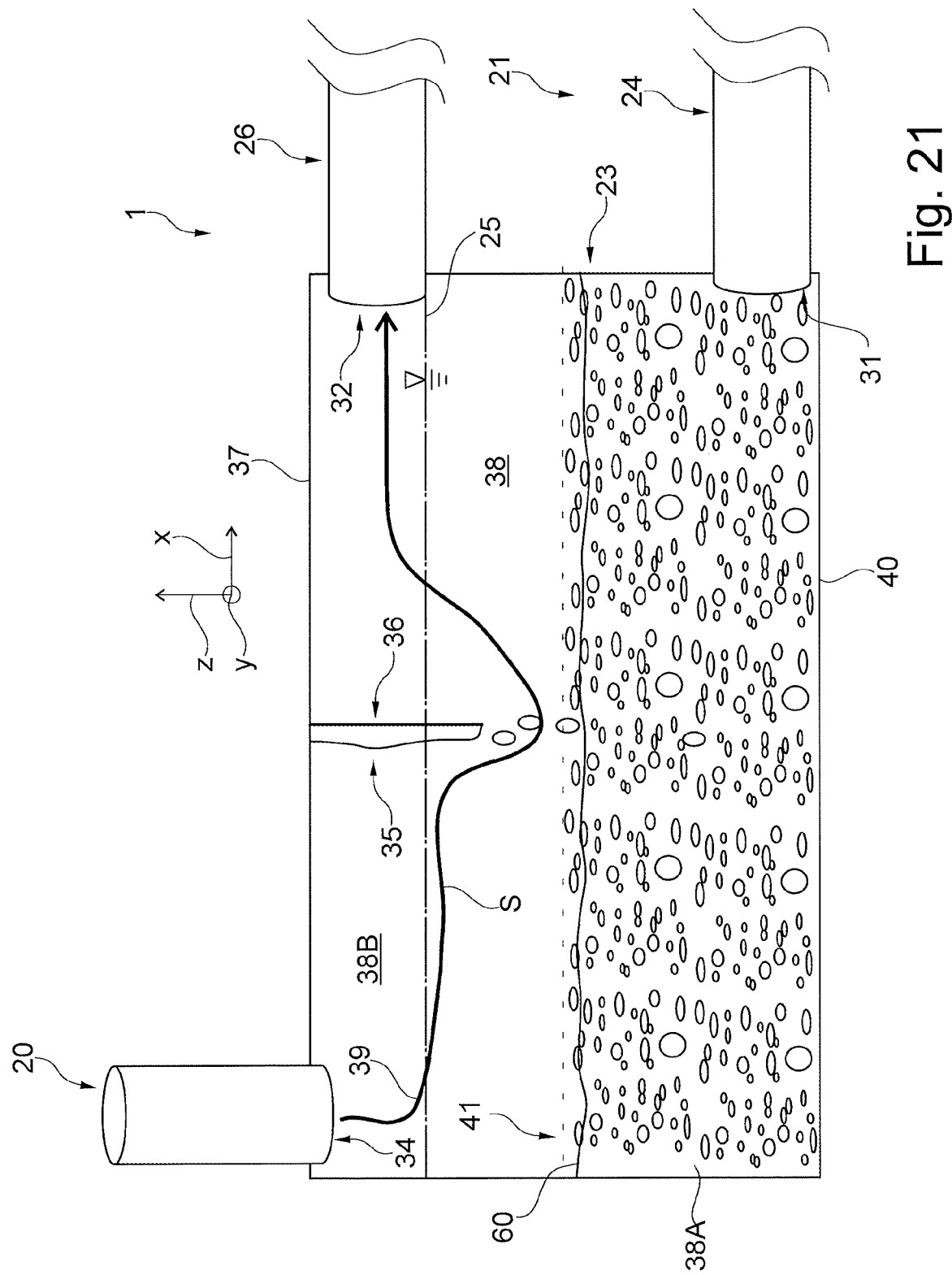

Another illustrative embodiment of the oil circuit 21 is illustrated in FIG. 21, which is a development of the embodiment of the oil circuit 21 according to FIG. 21 and in which the entire region 38A is filled with porous material of the retention device 41.

Figure 22:
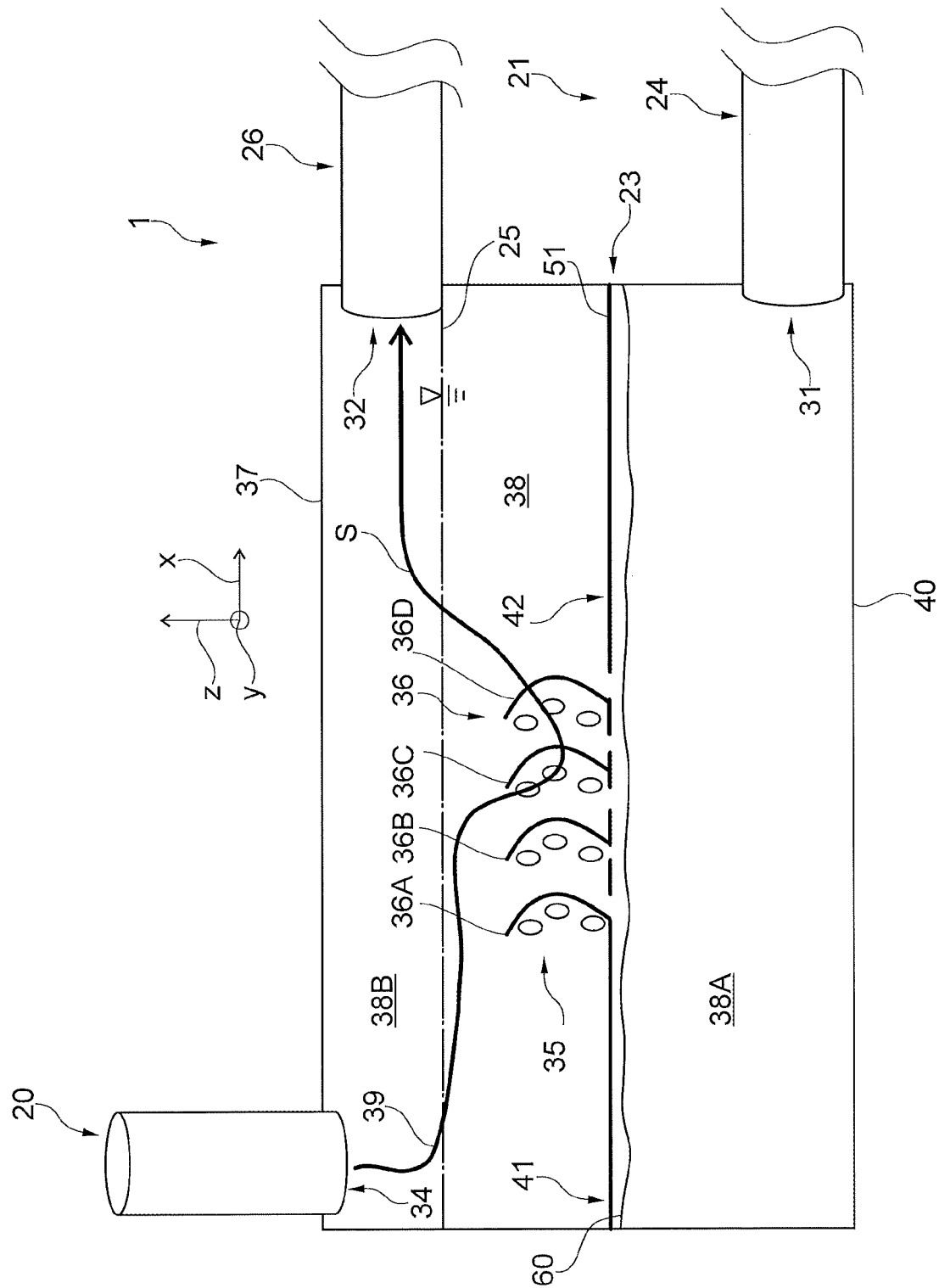

FIG. 22 shows an embodiment of the oil circuit 21 which corresponds substantially to the embodiment shown in FIG. 11 and differs only in the region of the oil separator 35 from this embodiment of the oil circuit 21 in that the oil separator 35 comprises a plurality of baffles 36A to 36D, which are spaced apart and of curved design. The baffles 36A to 36D are of concave design in relation to the flow direction S of the air-oil volume flow in the oil reservoir 23 and extend from the retention device 41 in the direction of the upper boundary wall 37 of the oil reservoir 23.

Depending on the respective application, provision can also be made for the baffles 36A to 36D to be formed with a convex curvature in relation to the flow direction S and to project from the upper boundary wall 37 into region 38B of the interior 38 of the oil reservoir 23. Moreover, there is also the possibility for the baffles 36A to 36D to be positioned in region 38B of the interior 38 of the oil reservoir 23 at a distance both from the upper boundary wall 37 and from the retention device 41.

Figure 23:
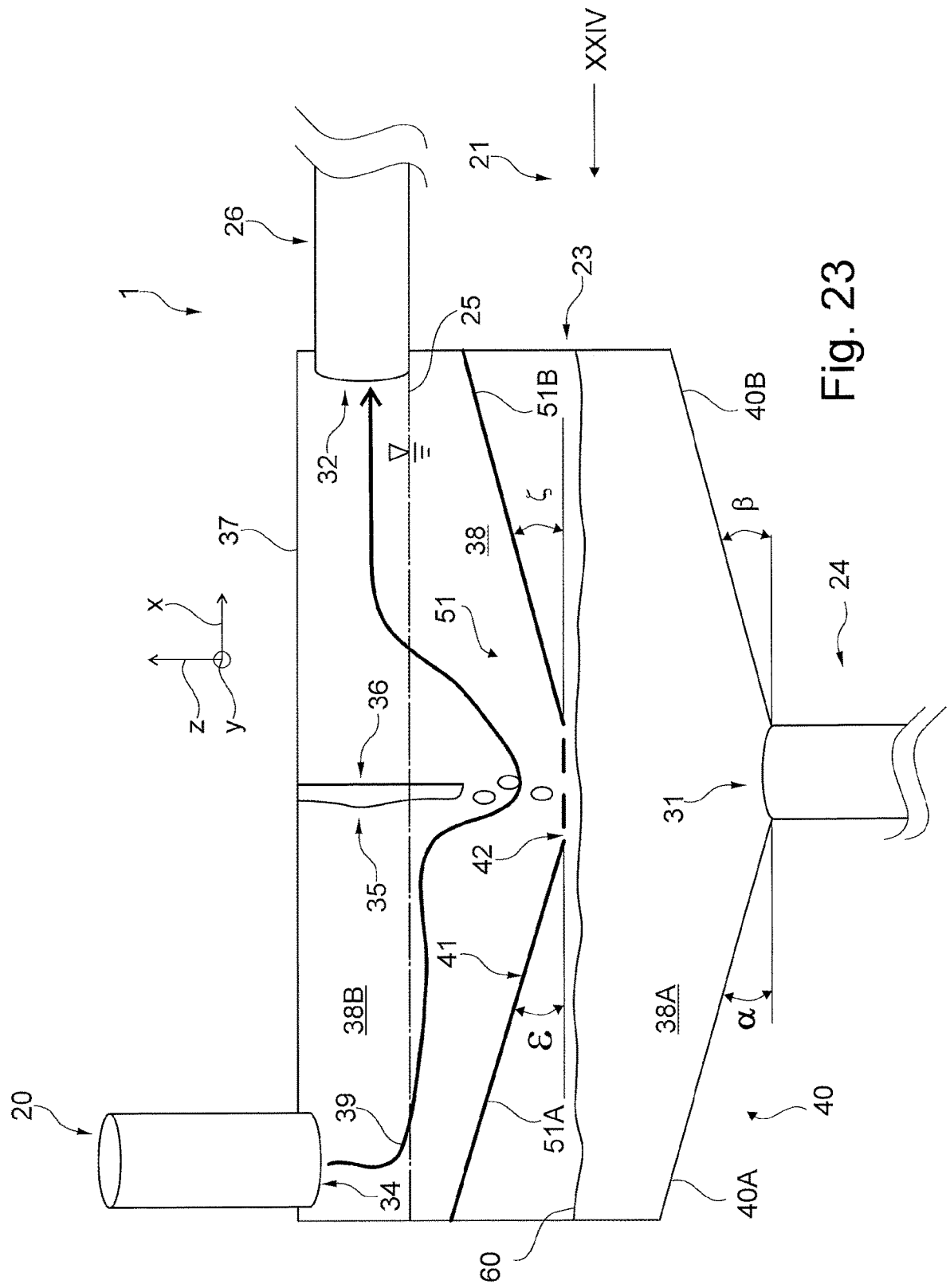
Figure 24:
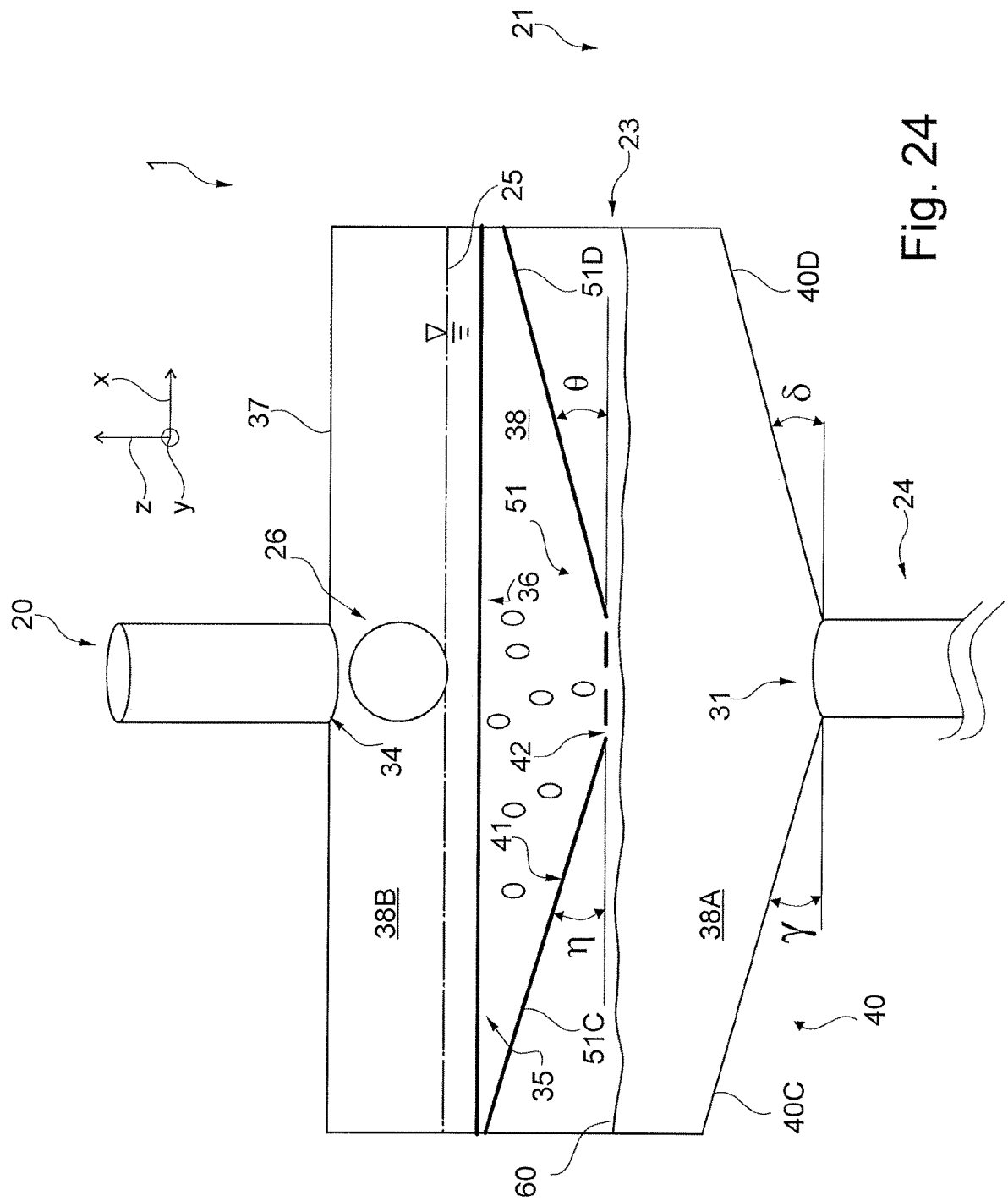

The embodiment of the oil circuit 21 shown in FIG. 23 and FIG. 24 differs from the illustrative embodiments of the oil circuit 21 which are described above both in the region of the retention device 41 and in the region of the lower boundary wall 40 of the oil reservoir 23 and is formed with an oil separator 35 corresponding to FIG. 11. FIG. 24 shows the oil reservoir 23 from a view XXIV indicated in FIG. 23. Furthermore, the oil reservoir 23 in FIG. 23 and FIG. 24 is illustrated in the installation position in the aircraft engine 1 and during horizontal flight of an aircraft embodied with the aircraft engine 1.

The retaining wall 51 of the retention device 41 and the lower boundary wall 40 of the oil reservoir 23 are of funnel-shaped design. Here, the opening 31 of the hydraulic line path 24 is provided at the lowest point of the lower boundary wall 40 of the oil reservoir and directly below the passage 42 in the retaining wall 51, which, in turn, is arranged directly below the baffle of the inertial separator 36.

From the two illustrations according to FIG. 23 and FIG. 24, it is apparent that the lower boundary wall 40 has a plurality of flat wall sections 40A to 40D, which each enclose an angle α, β, γ and δ with the xy plane and are likewise angled relative to one another. To the same extent, the retaining wall 51 of the retention device 41 is embodied with a plurality of flat retaining wall sections 51A to 51D, which, once again, enclose angles ε, ζ, η and θ with the xy plane and are likewise arranged at an angle to one another.

Here, the angles α to θ of the wall sections 40A to 40D and of the retaining wall sections 51A to 51D relative to the xy plane are each chosen in such a way that deviations of a current attitude of the aircraft from horizontal flight or pitching movements within a defined pitch angle range of the aircraft and also rolling movements of the aircraft within a defined roll angle range of the aircraft do not result in any significant return flow of oil stored in region 38A of the interior 38 of the oil reservoir 23 into region 38B above the retention device 41. Thus, the oil volume required for an adequate oil supply to the transmission 5 can be stored to the desired extent in the oil reservoir 23 and made available when required.

Here, the pitch angles α and β or ε and ζ as well as the roll angles γ and δ or η and θ can correspond to one another or differ from one another in accordance with the respective application in order to avoid the return flow of oil from region 38A in the direction of region 38B through the retention device 41 during in-flight operational situations of the aircraft that deviate from the operational state of horizontal flight.

Furthermore, provision can also be made for the funnel-shaped region of the retaining wall 51 and/or of the lower boundary wall 40 to be designed as a right cone or to comprise just two or three or more than four sections that are plane or curved with the same or different curvature and set at an angle to one another and to the xy plane. Thus, for example, provision can be made for the retaining wall and/or the lower boundary wall to have a multiplicity of facets similar to a ground diamond if the intention is to allow for a large number of different in-flight operational situations.

LIST OF REFERENCE SIGNS 1 continuous flow machine; aircraft engine
2 main axis of rotation
3 air inlet
4 fan
5 transmission
6 low-pressure compressor
7 high-pressure compressor
8 combustion device
9 high-pressure turbine
10 low-pressure turbine
11 outlet nozzle
12 engine nacelle
13 secondary flow duct
14 high-pressure shaft
15 low-pressure shaft
16 fan shaft
18 sun gear
19 core engine flow region
20 return of the transmission
21 oil circuit
22 strut
23 oil reservoir
24 hydraulic line path
25 defined filling level of the oil reservoir 23
26 further hydraulic line path
27 pump
28 sensor
29 cooler
30 valve unit
31 opening of hydraulic line path 24
32 opening of the further hydraulic line path 26
33 transfer region of the further hydraulic line path
34 inlet of the oil reservoir 23
35 oil separator
36 inertial separator
36A to 36C baffle
37 upper boundary wall of the oil reservoir 23
38 interior of the oil reservoir 23
38A lower inner region of the interior 38
38B upper inner region of the interior 38
39 air-oil volume flow
40 lower boundary wall of the oil reservoir 23
40A to 40D wall sections of the lower boundary wall
41 retention device
42 passage
43 aperture
44 line region
45 perforated feed pipe
46 pipe region
47 pipe elbow
48 outlet 49 outlet of the cyclone 50
50 cyclone
51 perforated retaining wall
51A to 51D retaining wall sections
52 flow guiding device
53 porous medium
58 bubbles
60 current oil level of the hydraulic fluid reservoir
A axial flow direction
L1 line
S flow direction
$\alpha, \beta, \varepsilon, \zeta$ pitch angles
$\gamma, \delta, \eta, \theta$ roll angles

The invention claimed is:

1. An aircraft engine comprising:
    a transmission;
    an oil circuit supplyinq oil to the transmission and further comprising:
        an oil reservoir including:
            a defined filling level;
            an inlet through which oil is discharged into the oil reservoir from the transmission; and
            an air-oil volume flow which is predominately air;
        a first hydraulic line path;
        a second hydraulic line path including an opening;
        an oil separator located in the air-oil volume flow at the oil reservoir between the inlet of the oil reservoir and the opening of the second hydraulic line path;
        wherein oil fed to the transmission is directed out of the transmission into the oil reservoir, and wherein oil is directed out of the oil reservoir and introduced directly back into the transmission via the first hydraulic line path;
        wherein, when a level of oil in the oil reservoir is below the defined filling level, oil is only fed to the first hydraulic line path; and
        wherein, when the defined filling level of the oil reservoir is reached, oil is also introduced into the second hydraulic line path.

2. The aircraft engine according to claim 1, wherein the opening of the second hydraulic line path is arranged at the defined filling level of the oil reservoir.

3. The aircraft engine according to claim 1, further comprising a transfer region, via which oil is introduced from the oil reservoir into the second hydraulic line path once the defined filling level of the oil reservoir has been reached.

4. The aircraft engine according to claim 1, wherein the first hydraulic line path includes a pump, by which oil is pumped out of the oil reservoir into the transmission.

5. The aircraft engine according to claim 4, wherein the pump is driven by the transmission.

6. The aircraft engine according to claim 4, wherein an operative connection between the transmission and the pump is activated or deactivated.

7. The aircraft engine according to claim 4, wherein the first hydraulic line path in a region between the pump and the transmission comprises a valve unit, by which oil pumped out of the oil reservoir by the pump is directed in one chosen from a direction of the transmission, back into the oil reservoir, and into the second hydraulic line path.

8. The aircraft engine according to claim 1, wherein the oil separator comprises an inertial separator.

9. The aircraft engine according to claim 1, wherein the air-oil volume flow emerges from the transmission, flowing from the inlet in a direction of the opening of the second hydraulic line path, wherein the oil separator includes a porous medium, through which the air-oil volume flow is passed, and wherein oil separated from the air-oil volume flow in a region of the porous medium flows off in a direction of the oil reservoir.

10. The aircraft engine according to claim 2, further comprising:
    an opening of the first hydraulic line path, and wherein the oil reservoir includes a lower inner region associated with the opening of the first hydraulic line path; and
    a retention device between the opening of the first hydraulic line path and the opening of the second hydraulic line path, and wherein the retention device limits a flow of oil in the oil reservoir from the lower inner region in a direction of the opening of the second hydraulic line path.

11. The aircraft engine according to claim 10, further comprising a housing region of the oil reservoir which delimits the lower inner region, and wherein the housing region is funnel-shaped, at least in some region or regions.

12. The aircraft engine according to claim 10,
    wherein the oil reservoir includes an upper inner region associated with the opening of the second hydraulic line path;
    wherein the retention device includes a retaining wall, which extends between the opening of the first hydraulic line path and the opening of the second hydraulic line path;
    wherein the lower inner region into which the first hydraulic line path opens is delimited by the retaining wall;
    wherein the upper inner region into which the second hydraulic line path opens is delimited by the retaining wall; and
    wherein the retention device includes at least one passage, wherein the at least one passage in each case includes a connection between the lower inner region of the oil reservoir and the upper inner region of the oil reservoir.

13. The aircraft engine according to claim 12, wherein the retaining wall includes a funnel-shaped region of the retaining wall.

14. The aircraft engine according to claim 13, further comprising a funnel-shaped housing region of the oil reservoir which delimits the lower inner region, and wherein the funnel-shaped housing region and the funnel-shaped region of the retaining wall are matched to one another in such a way that a defined oil volume is retained by the retention device in the lower inner region in various orientations of an aircraft embodied with the aircraft engine that deviate from horizontal flight of the aircraft.

15. The aircraft engine according to claim 10,
    wherein the oil separator further comprises a perforated feed pipe,
    wherein the perforated feed pipe includes a pipe region and a pipe elbow,
    wherein the inlet of the oil reservoir is connected to the perforated feed pipe;
    wherein the pipe region extends substantially above the retention device;
    wherein the pipe elbow is arranged between the inlet and the pipe region and in a region of which the air-oil volume flow flowing in via the inlet is deflected and oil is separated out of the air-oil volume flow; and
    wherein the pipe region includes a plurality of holes, from which the air-oil volume flow and oil separated out in the perforated feed pipe is discharged.

16. The aircraft engine according to claim 1, wherein the oil separator further comprises an extension of the inlet of the oil reservoir, wherein the extension discharges the air-oil volume flow from the transmission, wherein the extension extends from an upper boundary wall in a direction of a lower boundary wall of the oil reservoir, through a retention device, into the oil reservoir, wherein the air-oil volume flow flowing into the oil reservoir via the inlet is introduced from the inlet into an oil volume stored in the oil reservoir when the extension of the inlet dips into the oil volume stored in the oil reservoir.

17. The aircraft engine according to claim 1, wherein the oil separator includes a cyclone, which is shaped as one chosen from straight and tapered, and when tapered, tapers from the inlet of the oil reservoir for the air-oil volume flow that is discharged from the transmission in a direction of an outlet of the cyclone.

18. An aircraft engine comprising:
    a transmission;
    an oil circuit supplying oil to the transmission and further comprising:
        an oil reservoir including a defined filling level and an inlet through which oil is discharged into the oil reservoir from the transmission;
        a first hydraulic line path including:
            a pump, wherein the pump pumps oil out of the oil reservoir into the transmission; and
            a valve unit located in a region between the pump and the transmission;
        a second hydraulic line path;
    wherein the valve unit in the first hydraulic line path directs oil pumped out of the oil reservoir by the pump in one chosen from a direction of the transmission, back into the oil reservoir, and into the second hydraulic line path;
    wherein oil fed to the transmission is directed out of the transmission into the oil reservoir, and wherein oil is directed out of the oil reservoir and introduced directly back into the transmission via the first hydraulic line path;
    wherein when a level of oil in the oil reservoir is below the defined filling level, oil is only fed to the first hydraulic line path; and
    wherein when the defined filling level of the oil reservoir is reached, oil is also introduced into the second hydraulic line path.

19. An aircraft engine comprising:
    a transmission;
    an oil circuit supplying oil to the transmission and further comprising:
        an oil reservoir including:
            a defined filling level;
            an inlet through which oil is discharged into the oil reservoir from the transmission; and
            a first hydraulic line path;
        a second hydraulic line path including an opening;
        an oil separator located between the inlet of the oil reservoir and the opening of the second hydraulic line path, wherein the oil separator further comprises an extension of the inlet of the oil reservoir, wherein the extension discharges an air-oil volume flow from the transmission, wherein the extension extends from an upper boundary wall of the oil reservoir in a direction of a lower boundary wall and through a retention device into the oil reservoir, wherein the air-oil volume flow flowing into the oil reservoir via the inlet is introduced from the inlet into an oil volume stored in the oil reservoir when the extension of the inlet dips into the oil volume stored in the oil reservoir;
    wherein oil fed to the transmission is directed out of the transmission into the oil reservoir, and wherein oil is directed out of the oil reservoir and introduced directly back into the transmission via the first hydraulic line path;
    wherein when a level of oil in the oil reservoir is below the defined filling level, oil is only fed to the first hydraulic line path; and
    wherein when the defined filling level of the oil reservoir is reached, oil is also introduced into the second hydraulic line path.

* * * * *